US011811980B2

United States Patent
Takahashi et al.

(10) Patent No.: US 11,811,980 B2
(45) Date of Patent: Nov. 7, 2023

(54) ELECTRONIC APPARATUS THAT COMMUNICATES WITH A NETWORK AND TRANSMITS AN IMAGE, METHOD FOR CONTROLLING THE ELECTRONIC APPARATUS, AND RECORDING MEDIUM

(71) Applicant: CANON KABUSHIKI KAISHA, Tokyo (JP)

(72) Inventors: Ryo Takahashi, Tokyo (JP); Satoshi Masuda, Kanagawa (JP); Yuichiro Ishitsuka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/885,908

(22) Filed: Aug. 11, 2022

(65) Prior Publication Data

US 2022/0394140 A1    Dec. 8, 2022

Related U.S. Application Data

(63) Continuation of application No. PCT/JP2021/001856, filed on Jan. 20, 2021.

(30) Foreign Application Priority Data

Feb. 13, 2020  (JP) ................................ 2020-022214

(51) Int. Cl.
*H04N 1/00*  (2006.01)

(52) U.S. Cl.
CPC ..... *H04N 1/00172* (2013.01); *H04N 1/00244* (2013.01); *H04N 2201/0084* (2013.01)

(58) Field of Classification Search
None
See application file for complete search history.

(56) References Cited

FOREIGN PATENT DOCUMENTS

| JP | 2003-122935 A | 4/2003 |
|---|---|---|
| JP | 2003-319311 A | 11/2003 |
| JP | 2006-025257 A | 1/2006 |
| JP | 2008-076796 A | 4/2008 |
| JP | 2008-236396 A | 10/2008 |
| JP | 2014-044572 A | 3/2014 |
| JP | 2014-143567 A | 8/2014 |

OTHER PUBLICATIONS

Translation of JP 2008-076796 (Year: 2008).*
Translation of JP 2003-319311 (Year: 2003).*
Translation of JP 2014-143567 (Year: 2014).*

* cited by examiner

*Primary Examiner* — Lennin R Rodriguezgonzalez
*Assistant Examiner* — Lennin R Rodriguez
(74) *Attorney, Agent, or Firm* — Canon U.S.A., Inc. IP Division

(57) ABSTRACT

An electronic apparatus capable of communicating with an image processing server, the electronic apparatus including transmitting means for transmitting, to the image processing server, an image and information indicating an image processing parameter to be used when the image processing server performs image processing on the image, and controlling means for controlling display of a guidance indicating that an image obtained by applying the image processing by the image processing server to the image is to be checked on another apparatus from the electronic apparatus.

17 Claims, 15 Drawing Sheets

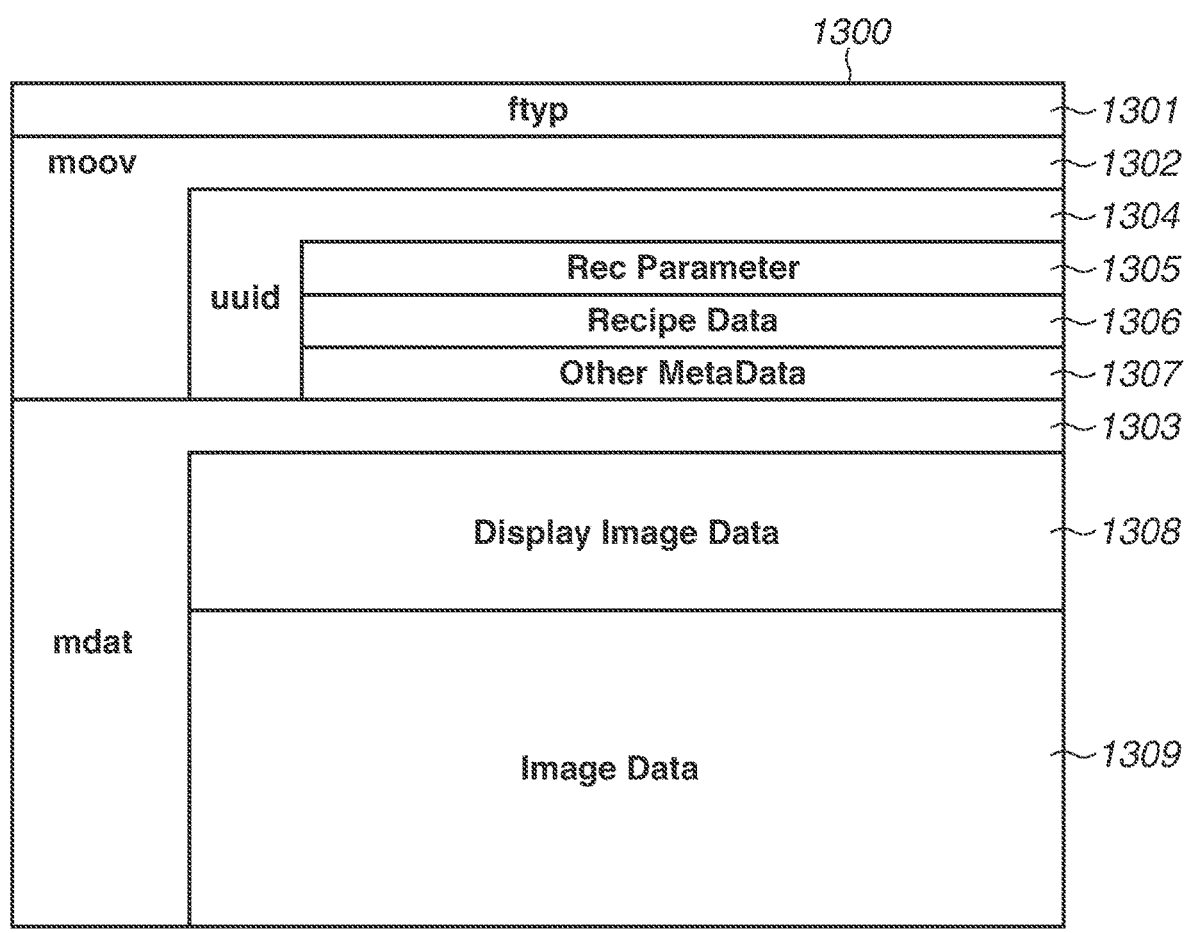

ELECTRONIC APPARATUS THAT COMMUNICATES WITH A NETWORK AND TRANSMITS AN IMAGE, METHOD FOR CONTROLLING THE ELECTRONIC APPARATUS, AND RECORDING MEDIUM

CROSS-REFERENCE TO RELATED APPLICATIONS

This application is a Continuation of International Patent Application No. PCT/JP2021/001856, filed Jan. 20, 2021, which claims the benefit of Japanese Patent Application No. 2020-022214, filed Feb. 13, 2020, both of which are hereby incorporated by reference herein in their entirety.

BACKGROUND OF THE INVENTION

Field of the Invention

The present invention relates to an electronic apparatus that can communicate with a network and transmit an image, a method for controlling the electronic apparatus, and a recording medium.

Background Art

A system where images are transmitted to a server on a network to perform image processing on the images on the server or store the images on the server has been known recently.

Patent Literature 1 discusses a system where raw data, which is an unprocessed digital image captured by a camera, is transmitted from the camera to a service server via a network and the service server performs raw development processing, which is a kind of image processing. Moreover, the camera is discussed to receive the image processed by the server and record the image on a recording medium of the camera.

Patent Literature 2 discusses a communication apparatus that displays a warning about insufficient capacity if a mode to store an image in a server is selected as a setting in posting an image to the server and the remaining capacity is low. More specifically, the communication apparatus is discussed to obtain information about the maximum storage capacity assigned for each user and the currently used capacity currently in use from the server apparatus, and if the remaining capacity is less than a predetermined value, display the warning about insufficient capacity.

In the system discussed in Patent Literature 1, it takes at least the time for the server to perform the image processing and the time for the camera to receive the processed image from the server before the result of the image processing is checked on the camera. Suppose that the user changes an image processing parameter. In such a case, the user who wants to check how the result is reflected will be kept waiting long in vain if the user is unaware of the time taken before checking. If the source of transmission of the image to the server is a camera, the waiting time can mean missing new imaging opportunities. If the transmission source is not a camera, the waiting time means a delay in other operations. If the communication is disconnected halfway, it takes even longer before the result of the image processing is checked or the result of the image processing becomes unable to be checked.

The waiting time at the image transmission source can be reduced or the risk of communication disconnection can be reduced by issuing an image processing instruction from the image transmission source to the server and accessing the server for the result of the image processing using a device different from the image transmission source. However, in such a case, the user of the image transmission source can be unaware of how to check the result of the image processing.

CITATION LIST

Patent Literature

PTL 1: Japanese Patent Laid-Open No. 2008-236396
PTL 2: Japanese Patent Laid-Open No. 2014-44572

SUMMARY OF THE INVENTION

The present invention is thus directed to providing an electronic apparatus that enables the user to check the result of image processing without confusion in a case where a server is instructed to perform the image processing, a method for controlling the electronic apparatus, a program, and a recording medium.

According to an aspect of the present invention, an electronic apparatus capable of communicating with an image processing server includes transmitting means for transmitting, to the image processing server, an image and information indicating an image processing parameter to be used when the image processing server performs image processing on the image, and controlling means for controlling display of a guidance indicating that an image obtained by applying the image processing by the image processing server to the image is to be checked on another apparatus from the electronic apparatus.

Further features of the present invention will become apparent from the following description of exemplary embodiments with reference to the attached drawings.

BRIEF DESCRIPTION OF THE DRAWINGS

FIG. 13 is a diagram illustrating a file structure.

DESCRIPTION OF THE EMBODIMENTS

Exemplary embodiments of the present invention will be described below with reference to the drawings.

<External View of Digital Camera 100>

Figure 1A:
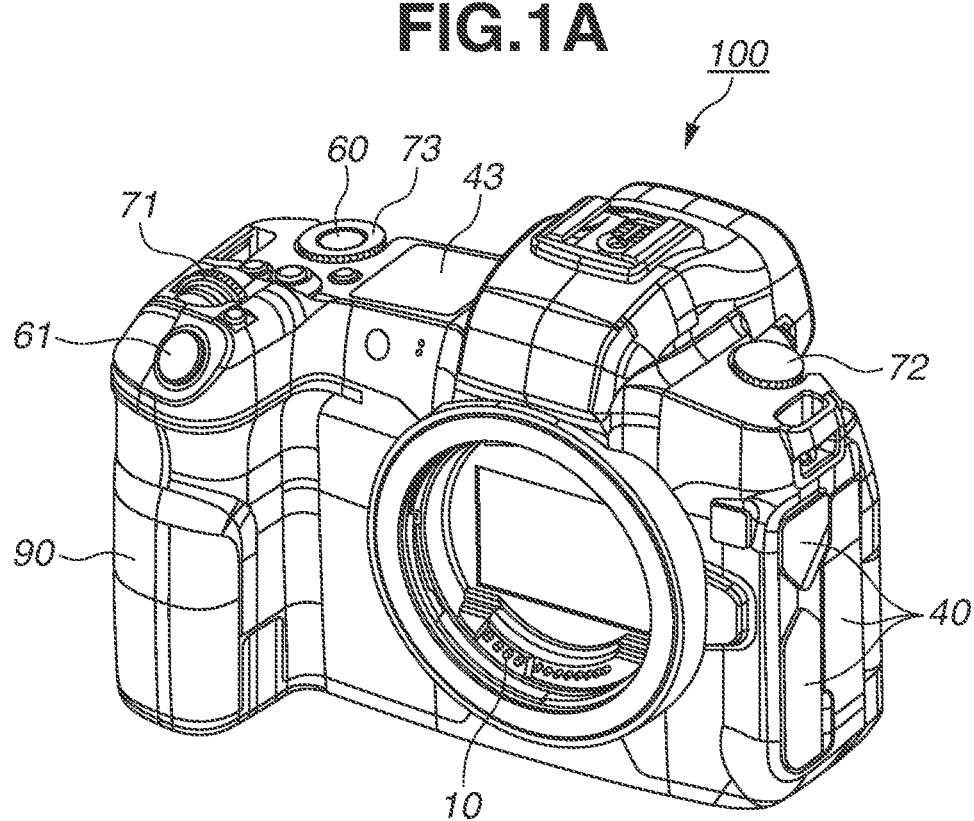
FIG. 1A is a perspective front view of a digital camera 100.
Figure 1B:
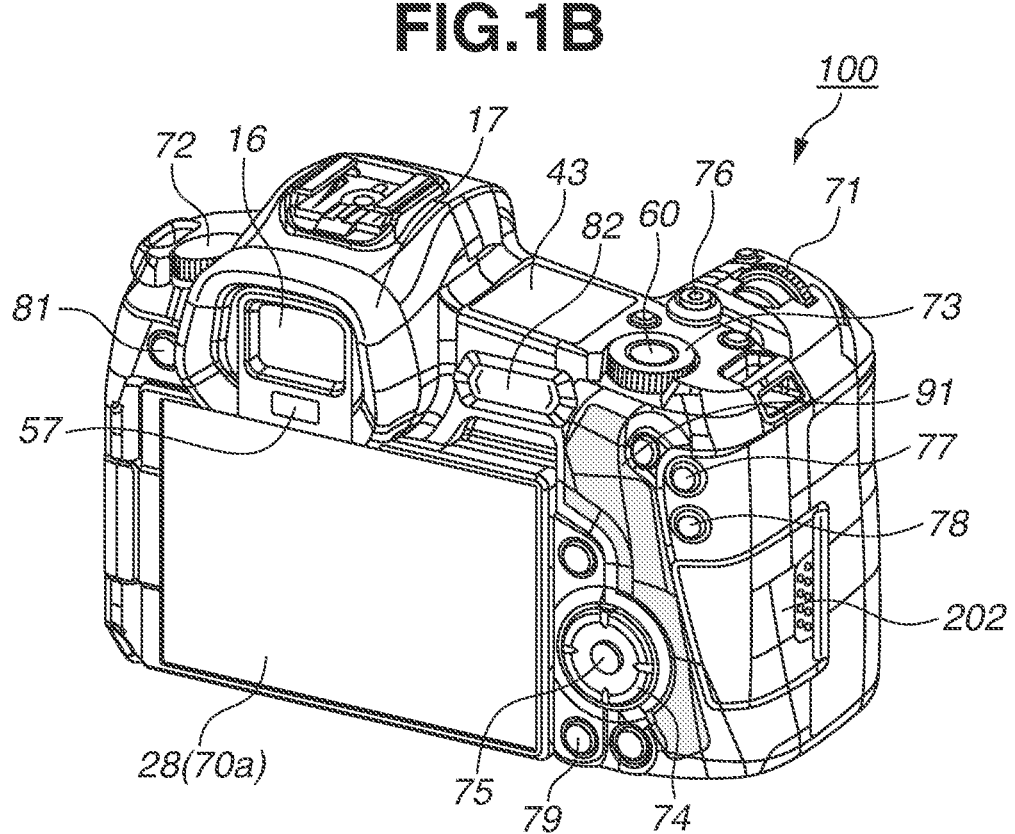
FIG. 1B is a perspective rear view of the digital camera 100.

FIGS. 1A and 1B illustrate external views of a digital camera 100 (imaging apparatus) as an example of an apparatus (electronic apparatus) to which the present invention can be applied. FIG. 1A is a perspective front view of the digital camera 100. FIG. 1B is a perspective rear view of the digital camera 100.

A display unit 28 is a display unit disposed on the rear of the digital camera 100, and displays images and various types of information. A touch screen 70a can detect a touch operation on the display surface (touch operation surface) of the display unit 28. An extra-viewfinder display unit 43 is a display unit disposed at the top surface of the digital camera 100, and displays various setting values of the digital camera 100 including a shutter speed and an aperture. A shutter button 61 is an operation member for issuing imaging instructions. A mode change switch 60 is an operation member for switching various modes. Terminal covers 40 are covers that protect connectors (not illustrated) for connection cables for connecting the digital camera 100 to external devices.

A main electronic dial 71 is a rotary operation member. Setting values such as the shutter speed and the aperture can be changed by rotating the main electronic dial 71. A power switch 72 is an operation member for powering the digital camera 100 on and off. A sub electronic dial 73 is a rotary operation member. A selection frame (cursor) can be moved and images can be scrolled through by rotating the sub electronic dial 73. A directional pad 74 is configured so that its top, bottom, left, and right portions can be individually pressed. The digital camera 100 can perform processing based on the pressed portion(s) of the directional pad 74. A set button 75 is a push button and mainly used to select and determine a selected item.

A moving image button 76 is used to give instructions to start and stop capturing (recording) a moving image. An automatic exposure (AE) lock button 77 is a push button. An exposure state can be locked by pressing the AE lock button 77 in an imaging standby state. A zoom button 78 is an operation button for switching a zoom mode on and off during a live view (LV) display in an imaging mode. An LV image can be zoomed in and out by operating the main electronic dial 71 with the zoom mode on. In a playback mode, the zoom button 78 functions as an operation button for zooming in on the playback image and increasing the zoom ratio. A playback button 79 is an operation button for switching between the imaging mode and the playback mode. If the playback button 79 is pressed in the imaging mode, the imaging mode transitions to the playback mode, and the latest of the images recorded on a recording medium 200 (to be described below) can be displayed on the display unit 28. A menu button 81 is a push button used to make an instruction operation to display a menu screen. If the menu button 81 is pressed, a menu screen capable of making various settings is displayed on the display unit 28. The user can intuitively make various settings using the menu screen displayed on the display unit 28, the directional pad 74, and the set button 75.

A touch bar 82 (multifunction bar, or M-Fn bar) is a linear touch operation member (line touch sensor) capable of accepting touch operations. The touch bar 82 is located at a position capable of a touch operation (capable of being touched) with the right thumb with a grip portion 90 held in the right hand (gripped with the right little finger, ring finger, and middle finger) so that the shutter button 61 can be pressed with the right index finger. In other words, the touch bar 82 is located at a position capable of operation by the user who is making eye access to an eyepiece unit 16 to look into the viewfinder and holding the digital camera 100 so that the shutter button 61 can be pressed at any time (in an imaging position). The touch bar 82 is an acceptance unit capable of accepting a tap operation (operation of making a touch and releasing the touch within a predetermined period without moving the touch position) and left and right slide operations (operations of making a touch and moving the touch position without releasing the touch) on the touch bar 82. The touch bar 82 is an operation member different from the touch screen 70a and does not have a display function.

A communication terminal 10 is a communication terminal for the digital camera 100 to communicate with a lens unit 150 (to be described below; detachably attachable). The eyepiece unit 16 is an eyepiece unit of an eyepiece viewfinder 17 (look-through viewfinder). The user can view a video image displayed on an electronic viewfinder (EVF) 29 inside via the eyepiece unit 16. An eye proximity detection unit 57 is an eye proximity detection sensor for detecting whether the user (photographer) puts an eye near the eyepiece unit 16. A lid 202 is a lid of a slot accommodating the recording medium 200 (to be described below). The grip portion 90 is a holding portion having a shape easy to grip with the right hand when the user holds the digital camera 100. The shutter button 61 and the main electronic dial 71 are located at positions capable of operation with the right index finger in the state where the digital camera 100 is held with the grip portion 90 gripped with the right little finger, ring finger, and middle finger. The sub electronic dial 73 and the touch bar 82 are located at positions capable of operation with the right thumb in the same state. A thumb rest portion 91 (thumb standby position) is a grip member disposed at a location on the rear of the digital camera 100 where the thumb of the right hand gripping the grip portion 90 can be easily put when not operating any of the operation members. The thumb rest portion 91 is made of a rubber member for improved holding force (gripping feel).

<Configuration Block Diagram of Digital Camera 100>

Figure 2:
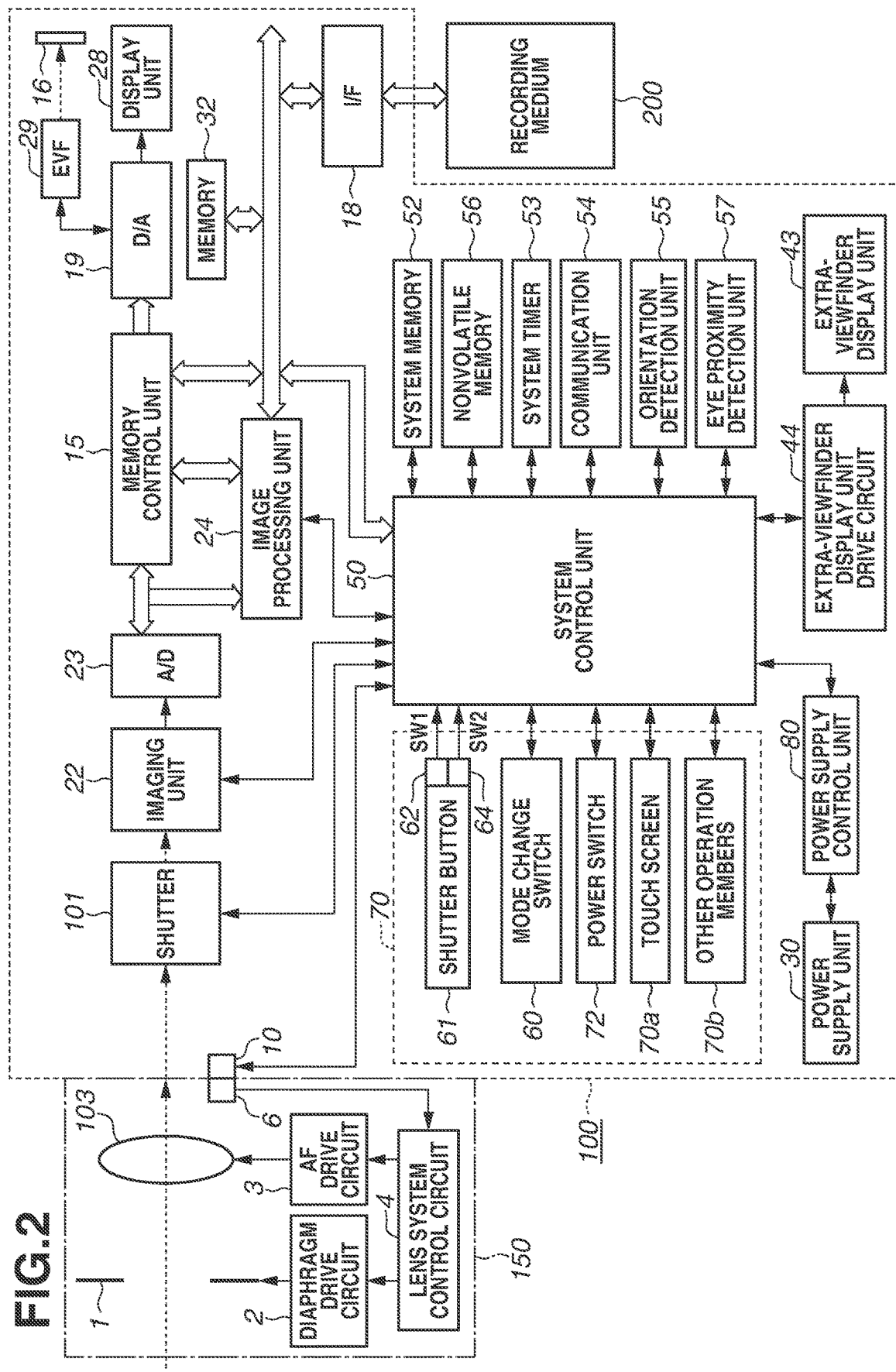
FIG. 2 is a schematic block diagram illustrating a hardware configuration example of the digital camera 100.

FIG. 2 is a block diagram illustrating a configuration example of the digital camera 100. The lens unit 150 is a lens unit including an interchangeable imaging lens. A lens 103 usually consists of a plurality of lenses, but is illustrated as a single lens in FIG. 2 for the sake of simplicity. A communication terminal 6 is a communication terminal for the lens unit 150 to communicate with the digital camera 100. The communication terminal 10 is one for the digital camera 100 to communicate with the lens unit 150. The lens unit 150 communicates with a system control unit 50 via the communication terminals 6 and 10. The lens unit 150 controls a diaphragm 1 via a diaphragm drive circuit 2 using a lens system control circuit 4 inside. The lens unit 150 also adjusts focus by changing the position of the lens 103 via an automatic focus (AF) drive circuit 3 using the lens system control circuit 4.

A shutter 101 is a focal plane shutter that can freely control the exposure time of an imaging unit 22 under control of the system control unit 50.

The imaging unit 22 is an image sensor including a charge-coupled device (CCD) or complementary metal-oxide-semiconductor (CMOS) device for converting an optical image into an electrical signal. The imaging unit 22 may include an image plane phase difference sensor that outputs defocus amount information to the system control unit 50. An analog-to-digital (A/D) converter 23 converts an analog signal output from the imaging unit 22 into a digital signal.

An image processing unit 24 performs predetermined processing (resize processing such as pixel interpolation and reduction, color conversion processing, etc.) on data from the A/D converter 23 or data from a memory control unit 15. The image processing unit 24 also performs predetermined calculation processing using captured image data. The system control unit 50 performs exposure control and ranging control based on the calculation result obtained by the image processing unit 24. Through-the-lens (TTL) AF processing, AE processing, and electronic flash (EF; preliminary flash emission) processing are thereby performed. The image processing unit 24 further performs predetermined calculation processing using the captured image data, and performs TTL automatic white balance (AWB) processing based on the obtained calculation result.

The output data from the A/D converter 23 is written to a memory 32 via the image processing unit 24 and the memory control unit 15. Alternatively, the output data from the A/D converter 23 is written to the memory 32 via the memory control unit 15 without the intervention of the image processing unit 24. The memory 32 stores the image data that is obtained by the imaging unit 22 and digitally converted by the A/D converter 23, and image data to be displayed on the display unit 28 and the EVF 29. The memory 32 has a sufficient storage capacity to store a predetermined number of still images and a predetermined duration of moving images and sounds.

The memory 32 also functions as a memory for image display (video memory). A digital-to-analog (D/A) converter 19 converts the data for image display stored in the memory 32 into an analog signal, and supplies the analog signal to the display unit 28 and the EVF 29. The display image data written to the memory 32 is thus displayed on the display unit 28 and the EVF 29 via the D/A converter 19. The display unit 28 and the EVF 29 each are a display such as a liquid crystal display (LCD) and an organic electroluminescence (EL) display, and provide display based on the analog signal from the D/A converter 19. A live view display (LV) can be provided by converting the digital signal A/D-converted by the A/D converter 23 and accumulated in the memory 32 into an analog signal through the D/A converter 19, and successively transferring the analog signal to the display unit 28 or the EVF 29 for display. The image displayed by the live view display will hereinafter be referred to as a live view image (LV image).

The system control unit 50 is a control unit including at least one processor and/or at least one circuit, and controls the entire digital camera 100. The system control unit 50 is a processor as well as a circuit. The system control unit 50 implements various processes according to the present exemplary embodiment to be described below by executing programs recorded in a nonvolatile memory 56. The system control unit 50 also performs display control by controlling the memory 32, the D/A converter 19, the display unit 28, the EVF 29, etc.

A system memory 52 is a random access memory (RAM), for example. The system control unit 50 loads operating constants of the system control unit 50, variables, and the programs read from the nonvolatile memory 56 into the system memory 52.

The nonvolatile memory 56 is an electrically erasable and recordable memory. Examples include an electrically erasable programmable read-only memory (EEPROM). The operating constants of the system control unit 50 and the programs are recorded in the nonvolatile memory 56. As employed herein, the programs refer to ones for performing various flowcharts to be described below in the present exemplary embodiment.

A system timer 53 is a clocking unit for measuring time to be used for various controls and the time of a built-in clock.

A communication unit 54 transmits and receives video signals and audio signals to and from an external device connected wirelessly or via a cable. The communication unit 54 can also connect to a wireless local area network (LAN) and the Internet. The communication unit 54 can also communicate with an external device using Bluetooth® and Bluetooth® Low Energy. The communication unit 54 can transmit images captured by the imaging unit 22 (including an LV image) and images recorded on the recording medium 200, and receive image data and other various types of information from external devices.

An orientation detection unit 55 detects the orientation of the digital camera 100 with respect to the direction of gravity. Whether an image captured by the imaging unit 22 is one captured with the digital camera 100 held landscape or one captured with the digital camera 100 held portrait can be determined based on the orientation detected by the orientation detection unit 55. The system control unit 50 can add orientation information based on the orientation detected by the orientation detection unit 55 to the image file of the image captured by the imaging unit 22 or rotate the image and record the rotated image. An acceleration sensor or a gyro sensor can be used as the orientation detection unit 55. The movement of the digital camera 100 (such as a pan, tilt, lift-up, and whether the digital camera 100 is at rest) can also be detected using the acceleration sensor or gyro sensor which is the orientation detection unit 55.

The eye proximity detection unit 57 is an eye proximity detection sensor that detects the approach (eye proximity) and withdrawal (eye separation) of an eye (object) to and from the eyepiece unit 16 of the eyepiece viewfinder 17 (hereinafter, referred to simply as "viewfinder") (proximity detection). The system control unit 50 switches display (display state) and non-display (hidden state) of the display unit 28 and the EVF 29 based on the state detected by the eye proximity detection unit 57. More specifically, if the digital camera 100 is in the imaging standby state and a switching setting of the display destination is set to automatic switching, the system control unit 50 turns on the display of the display unit 28 as the display destination and hides the display of the EVF 29 during non-eye proximity. The system control unit 50 turns on the display of the EVF 29 as the display destination and hides the display of the display unit 28 during eye proximity. For example, an infrared proximity sensor can be used as the eye proximity detection unit 57, and can detect the approach of an object to the eyepiece unit 16 of the viewfinder 17 including the built-in EVF 29. If an object approaches, infrared rays emitted from a light emitting portion (not illustrated) of the eye proximity detection unit 57 are reflected from the object and received by a light receiving portion (not illustrated) of the infrared proximity sensor. How close the object is to the eyepiece unit 16 (eye proximity distance) can also be determined based on the amount of infrared rays received. The eye proximity detection unit 57 can thus perform eye proximity detection to detect the proximity distance of the object to the eyepiece unit 16. If an object approaching the eyepiece unit 16 from a non-eye proximity state (non-approach state) to within a predetermined distance is detected, eye proximity is detected. If the object having been detected to be in proximity in the eye proximity state (approach state) gets a predetermined distance or more away from the eyepiece unit 16, eye separation is detected. The threshold for detecting eye proximity and the threshold for detecting eye separation may be different. For example, the two thresholds may have hysteresis. After the detection of eye proximity, the eye proximity state continues until eye separation is detected. After the detection of eye separation, the non-eye proximity state continues until eye proximity is detected. The infrared proximity sensor is just an example, and other sensors capable of detecting a state that can be regarded as eye proximity may be employed as the eye proximity detection unit 57.

The extra-viewfinder display unit 43 displays various setting values of the camera, including the shutter speed and the aperture, via an extra-viewfinder display unit drive circuit 44.

A power supply control unit 80 includes a battery detection circuit, a direct-current-to-direct-current (DC-DC) converter, and a switch circuit for switching blocks to be energized, and detects the presence or absence of a battery attached, the type of battery, a remaining battery level, etc. The power supply control unit 80 also controls the DC-DC converter based on the detection results and instructions from the system control unit 50, and supplies needed voltages to various components, including the recording medium 200, for needed periods. A power supply unit 30 includes a primary battery such as an alkali battery and a lithium battery, a secondary battery such as a nickel-cadmium (NiCd) battery, a nickel metal hydride (NiMH) battery, and a lithium-ion (Li-ion) battery, and/or an alternating-current (AC) adaptor.

A recording medium interface (I/F) 18 is an interface with the recording medium 200 such as a memory card and a hard disk. The recording medium 200 is a recording medium such as a memory card for recording captured images, and includes a semiconductor memory or a magnetic disk.

An operation unit 70 is an input unit for accepting operations from the user (user operations), and used to input various operation instructions to the system control unit 50. As illustrated in FIG. 2, the operation unit 70 includes the shutter button 61, the mode change switch 60, the power switch 72, the touch screen 70a, and other operation members 70b. The other operation members 70b include the main electronic dial 71, the sub electronic dial 73, the directional pad 74, the set button 75, the moving image button 76, the AE lock button 77, the zoom button 78, the playback button 79, the menu button 81, and the touch bar 82.

The shutter button 61 includes a first shutter switch 62 and a second shutter switch 64. The first shutter switch 62 turns on to generate a first shutter switch signal SW1 when the shutter button 61 is operated halfway, i.e., half-pressed (imaging preparation instruction). Based on the first shutter switch signal SW1, the system control unit 50 starts imaging preparation operations such as AF processing, AE processing, AWB processing, and EF processing.

The second shutter switch 64 turns on to generate a second shutter switch signal SW2 when the shutter button 61 is completely operated, i.e., fully pressed (imaging instruction). Based on the second shutter switch signal SW2, the system control unit 60 starts a series of image capturing operations from the reading of the signal from the imaging unit 22 to the writing of the captured image to the recording medium 200 as an image file.

The mode change switch 60 switches the operation mode of the system control unit 50 to one of a still image capturing mode, a moving image capturing mode, the playback mode, etc. The still image capturing mode includes the following modes: an automatic imaging mode, an automatic scene determination mode, a manual mode, an aperture priority mode (aperture value [Av] mode), a shutter speed priority mode (time value [Tv] mode), and a program AE mode (program [P] mode). The still image capturing mode also includes various scene modes that have imaging settings specific to respective imaging scenes, as well as a custom mode. The user can switch directly to one of the modes using the mode change switch 60. Alternatively, the user may once switch to an imaging mode list screen by using the mode change switch 60, and then selectively switch to one of a plurality of modes displayed using another operation member. The moving image capturing mode may similarly include a plurality of modes.

The touch screen 70a is a touch sensor for detecting various touch operations on the display surface of the display unit 28 (operation surface of the touch screen 70a). The touch screen 70a and the display unit 28 may be integrally configured. For example, the touch screen 70a is configured so that its light transmittance does not interfere with display on the display unit 28, and attached onto the display surface of the display unit 28. Input coordinates of the touch screen 70a are then associated with display coordinates on the display screen of the display unit 28. This can provide a graphical user interface (GUI) that enables the user to make operations as if the user can directly operate the screen displayed on the display unit 28.

The system control unit 50 can detect the following operations or states of the touch screen 70a:

That a finger or pen that has not been touching the touch screen 70a makes a new touch on the touch screen 70a. In other words, a start of a touch (hereinafter, referred to as a touch-down);

The state where the touch screen 70a is touched with a finger or pen (hereinafter, referred to as a touch-on);

That the finger or pen touching the touch screen 70a moves (hereinafter, referred to as a touch-move);

That the finger or pen touching the touch screen 70a is separated (released) from the touch screen 70a. In other words, an end of a touch (hereinafter, referred to as a touch-up); and The state where nothing touches the touch screen 70a (hereinafter, referred to as a touch-off).

If a touch-down is detected, a touch-on is detected at the same time. After a touch-down, a touch-on usually continues to be detected until a touch-up is detected. If a touch-move is detected, a touch-on is also detected at the same time. If a touch-on is detected and the touch position does not move, a touch-move is not detected. After all fingers and pens touching the touch screen 70a are detected to be touched up, a touch-off is detected.

Such operations and states and the position coordinates of the finger(s) and/or the pen touching the touch screen 70a are notified to the system control unit 50 via an internal bus. The system control unit 50 determines what operation (touch operation) is made on the touch screen 70a based on the notified information. As for a touch-move, the moving direction of the finger or pen moving on the touch screen 70a can also be determined in terms of a vertical component and a horizontal component on the touch screen 70*a* separately, based on a change in the position coordinates. If a touch-move for a predetermined distance or more is detected, a slide operation is determined to be made. An operation of quickly moving a finger touching the touch screen 70*a* for some distance and immediately releasing the finger will referred to as a flick. In other words, a flick is an operation of quickly moving the finger over the touch screen 70*a* as if flicking. If a touch-move is detected to be made for a predetermined distance or more at a predetermined speed or more and a touch-up is immediately detected, a flick can be determined to be made (a flick can be determined to be made after a slide operation). Moreover, a touch operation of touching a plurality of positions (for example, two positions) together (making a multi-touch) and bringing the touch positions closer to each other will be referred to as a pinch-in. A touch operation of separating the touch positions away from each other will be referred to as a pinch-out. A pinch-out and a pinch-in are referred to collectively as pinch operations (or simply pinches). The touch screen 70*a* may be a touch screen using one of various methods including a resistive film, capacitive, surface elastic wave, infrared, electromagnetic induction, image recognition, and optical sensor methods. Some methods detect a touch based on a contact on the touch screen. Some detect a touch based on approach of a finger or pen to the touch screen. Either type may be employed.

Figure 3:
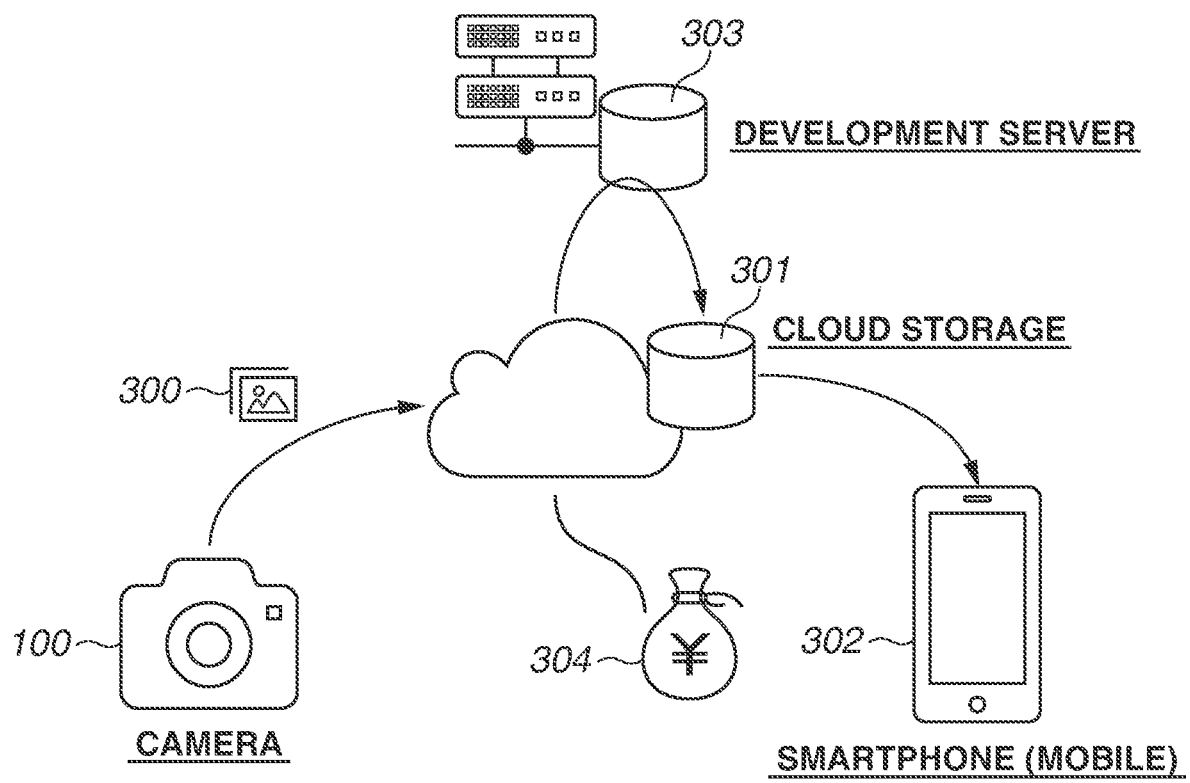
FIG. 3 is a conceptual diagram of an image processing system including the digital camera 100.

FIG. 3 is a conceptual diagram of an image processing system including the digital camera 100, and illustrates the relationship between the digital camera 100 and peripheral devices such as a cloud server.

A cloud storage 301 is a cloud storage server for storing images. With the digital camera 100 and the cloud storage 301 associated (paired) in advance, a given captured image 300 can be transmitted to the cloud storage 301 based on a transmission instruction to the camera. For the association, the digital camera 100 and the cloud storage 301 are linked using information (user account information) from which the user can be identified, such as a user identifier (ID).

A smartphone 302 is a mobile device (mobile phone terminal or tablet terminal) for browsing images. In the present exemplary embodiment, the smartphone 302 is a smartphone. The images stored in the cloud storage 301 can be browsed using the smartphone 302.

A development server 303 is a cloud image processing server for performing image processing such as raw development. The development server 303 receives a development instruction from the smartphone 302 and the like, and performs development processing on an image stored in the cloud storage 301. The cloud development server 303 has high processing power compared to personal computers (PCs), and is capable of advanced types of image processing as compared to development applications on PCs. The latest types of image processing can be performed using the development server 303 even if the terminals such as the smartphone 302 are not updated with programs for performing the latest image processing. Specifically, when a development instruction is given, the raw image stored in the cloud storage 301 is transmitted to the development server 303, and the development server 303 performs development processing such as deep learning-based advanced noise reduction. The digital camera 100 is not capable of such an advanced type of development processing (image processing). When the development processing ends, the development server 303 transmits a Joint Photographic Experts Group (JPEG) (or High Efficiency Image File Format [HEIF]) image that is the resulting developed image to the cloud storage 301. The development processing performed using the development server 303 will hereinafter be referred to as cloud development processing.

In the present exemplary embodiment, a method for browsing the result of the advanced development processing using the smartphone 302 will be described.

If the digital camera 100, the cloud storage 301, and the development server 303 are linked (associated) using identification information such as a user ID, the digital camera 100 can issue a development instruction to the development server 303. Specifically, the user adjusts development parameters (image processing parameters) about the color (such as white balance and brightness) of a raw image stored in the digital camera 100. The adjusted development parameters are recorded in the raw image file. The digital camera 100 then transmits the raw image file to the cloud storage 301 along with a cloud development processing instruction. The raw image file is transferred to the development server 303 via the cloud storage 301. The development server 303 performs development processing based on the development parameters (image processing parameters) adjusted on the camera, and further performs the foregoing advanced image processing at the same time.

Next, details of the cloud development processing and a user interface of the digital camera 100 for issuing a development instruction to the development server 303 will be described. Before the detailed description, a supplementary description of the development server 303, including two premises in the present exemplary embodiment, will be given.

Premise (1): the development server is a dedicated server in the cloud and incurs server maintenance costs and server communication costs.

Premise (2): a plurality of servers runs in parallel as the development server.

There are two reasons to apply premise (2) to the development server of the present exemplary embodiment. First, the plurality of servers enables parallel development processing for processing speed-up. For example, if development processing of a single raw image is performed by four servers, the image can be divided into four areas and the development processing can be simultaneously performed by the four servers. This means that the processing time can be approximately one-quarter as compared to the case of performing the development processing by a single server. If development instructions are simultaneously given by four users, the development instructions from the users can be assigned to and processed by the respective servers to reduce processing wait time as compared to with a single server. The second reason is to reduce load per server. For example, if one of four servers becomes unusable due to a failure, the remaining three can perform processing and the service does not need to be shut down.

Note that even if a plurality of servers is run to provide an environment capable of parallel processing, cases where several thousands of users simultaneously give development instructions need to be taken into consideration. Taking account of the incurred server maintenance costs and communication costs mentioned in premise (1) as well, the service provider desirably sets a limit (upper limit) on usage per user. For example, a restriction that the number of images developable per user per month be M (M is a number) can be imposed. For that purpose, the development processing service (image processing service) is managed to be usable only by joined users who have created accounts etc. In the present exemplary embodiment, a user setting management unit 304 takes charge of the management. The user setting management unit 304 may be implemented by the storage server or by a management server different from the storage server.

With the foregoing user management, the cloud service (cloud development processing) can be provided either for free or on a paid basis. The free service means that the cloud service can be used up to M images per month by simply creating a user account (hereinafter, referred to simply as an account). The paid service means that the cloud service can be used up to M images per month for a fee like a subscription service. The information about the upper limit of usage can be obtained by an inquiry from an external device like the digital camera 100 associated with the storage server. A user interface for creating an account and for registration such as subscription may be provided by the digital camera 100 or other devices such as the smartphone 302.

In view of the foregoing, details of the cloud development processing and the user interface of the digital camera for issuing a development instruction to the development server will be described.

FIGS. 4 to 8 are flowcharts illustrating processing for the digital camera 100 (hereinafter, the term camera shall refer to the digital camera 100) to issue a cloud development processing instruction. Each of the flowcharts of FIGS. 4 to 8 is implemented by the system control unit 50 loading a program recorded in the nonvolatile memory 56 into the system memory 52 and executing the program. FIGS. 9A to 12B illustrate examples of display by the camera. FIG. 13 is a structural diagram of a raw image file. A description will be given with reference to these diagrams.

Figure 4:
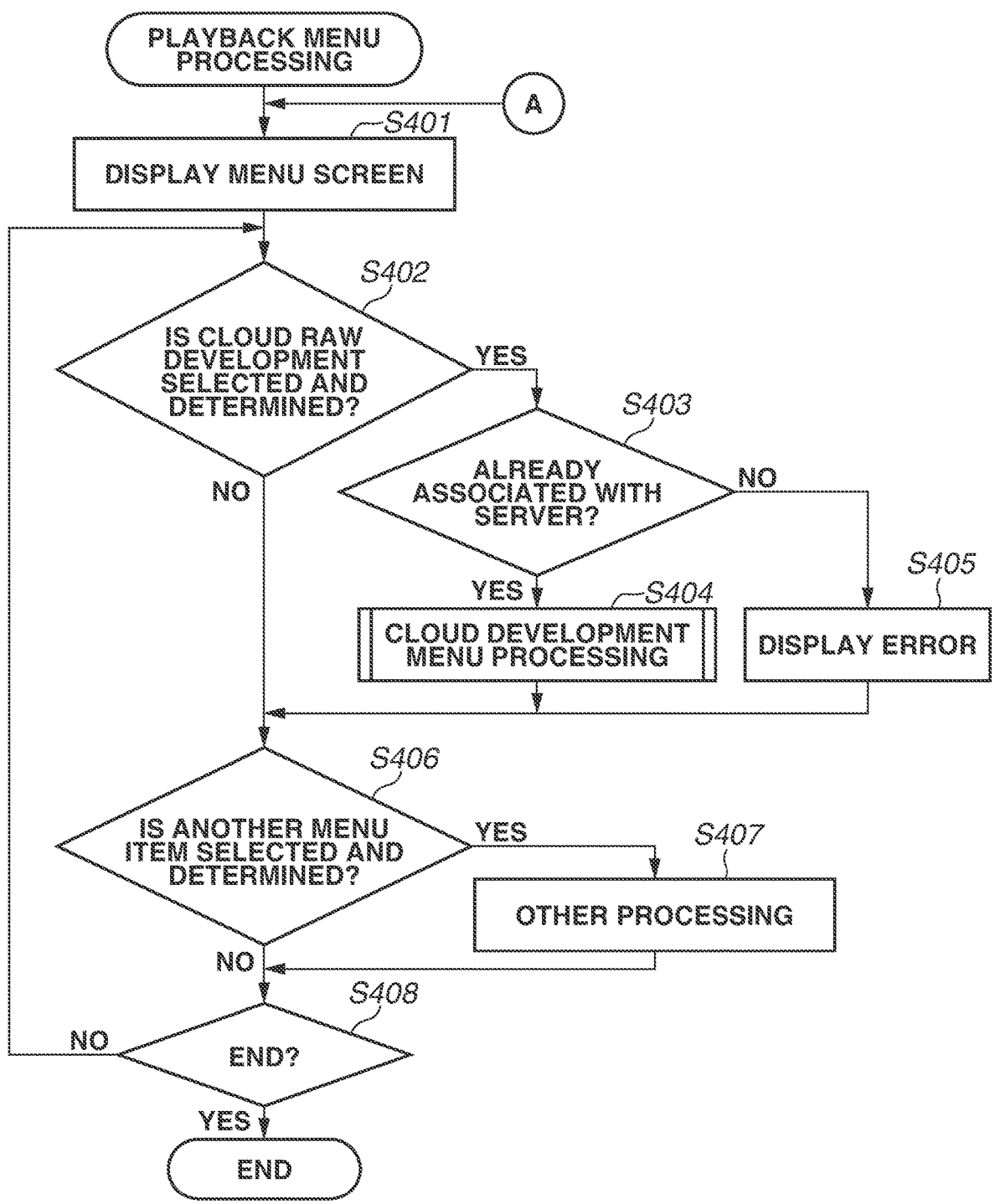
FIG. 4 is a flowchart of playback menu processing.

FIG. 4 illustrates a flow related to playback menu processing performed by the camera. The processing of FIG. 4 is started by activating the digital camera 100, setting the digital camera 100 to a playback mode, and pressing the menu button 81 with a playback image displayed (with a playback screen displayed).

Figure 9A:
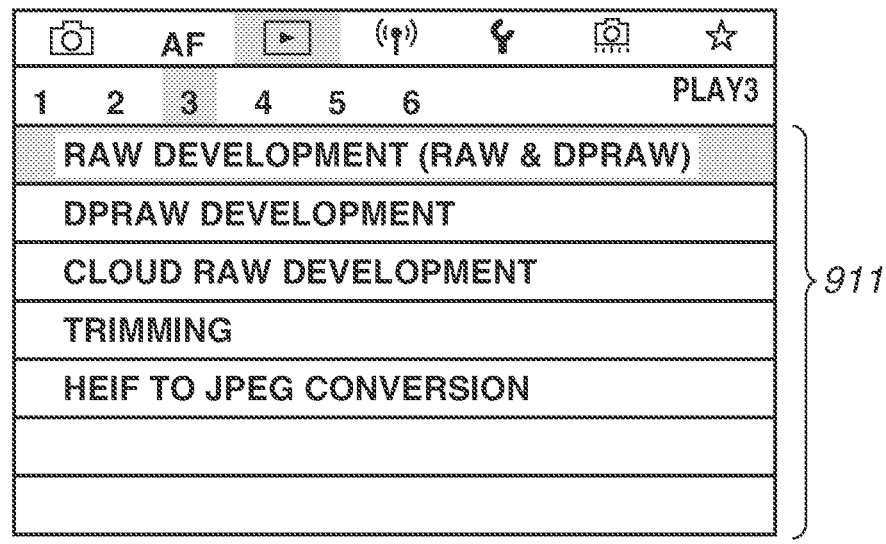
FIG. 9A illustrates a display example of a playback menu screen.

In step S401, the system control unit 50 displays a playback menu screen on the display unit 28 of the digital camera 100. FIG. 9A illustrates a display example of the playback menu image. The playback menu screen displays a plurality of menu items. For example, menu items 911 including "trimming", "raw development" for issuing an instruction for development in the camera main body, "HEIF to JPEG conversion", and "cloud raw development" are displayed. The user can select a menu item by moving a cursor to one of the displayed menu items using the operation unit 70. The user can determine to select (hereinafter, referred to as select and determine) the menu item selected by the cursor by pressing the set button 75.

In step S402, the system control unit 50 determines whether the menu item 911 for cloud raw development is selected and determined among the menu items displayed on the playback menu screen. If the menu item 911 is selected and determined (YES in step S402), the processing proceeds to step S403. If not (NO in step S402), the processing proceeds to step S406.

In step S403, the system control unit 50 determines whether the digital camera 100 has been associated (paired) with the cloud storage 301. If the digital camera 100 has been associated with the cloud storage 301 (YES in step S403), the processing proceeds to step S404. If the digital camera 100 has not been associated with the cloud storage 301 (NO in step S403), the processing proceeds to step S405. The digital camera 100 can be association with the cloud storage 301 in advance by using a pairing setting item included in a setting menu screen of the digital camera 100.

In the pairing setting, the digital camera 100 connects to the cloud storage 301 and the user logs in by inputting account information to the digital camera 100, whereby individual identification information about the digital camera 100 and the account information are associated to establish pairing. With the pairing established, the individual identification information about the digital camera 100 is recorded in the cloud storage 301 or the user setting management unit 304 in association with the account information. Moreover, with the pairing established, the account information and information indicating the establishment of the pairing are recorded in the nonvolatile memory 56 of the digital camera 100. In step S403, the system control unit 50 refers to the nonvolatile memory 56. If the information indicating the establishment of the pairing is recorded, the system control unit 50 determines that the digital camera 100 has been associated (paired) with the cloud storage 301. If not, the system control unit 50 determines that the digital camera 100 has not been associated with the cloud storage 301. In other words, the determination of step S403 can be made offline without connecting to the cloud storage 301.

In step S404, the system control unit 50 performs cloud development menu processing. The cloud development menu processing will be described below with reference to FIG. 5.

In step S405, the system control unit 50 displays an error screen on the display unit 28. Examples of the error messages displayed here include "not associated" and "pair your camera with the server".

In step S406, the system control unit 50 determines whether a menu item (another menu item) other than the menu item 911 for cloud raw development is selected and determined among the plurality of menu items displayed on the playback menu screen. If another menu item is selected and determined (YES in step S406), the processing proceeds to step S407. If not (NO in step S406), the processing proceeds to step S408.

In step S407, the system control unit 50 performs processing corresponding to the menu item selected and determined in step S406. For example, if trimming is selected and determined, the system control unit 50 displays a screen for trimming the image.

In step S408, the system control unit 50 determines whether an instruction to end the playback menu screen is given. If the end instruction is given (YES in step S408), the playback menu processing ends. The screen is switched to an image playback screen in the playback mode. If the end instruction is not given (NO in step S408), the processing returns to step S402.

Figure 5:
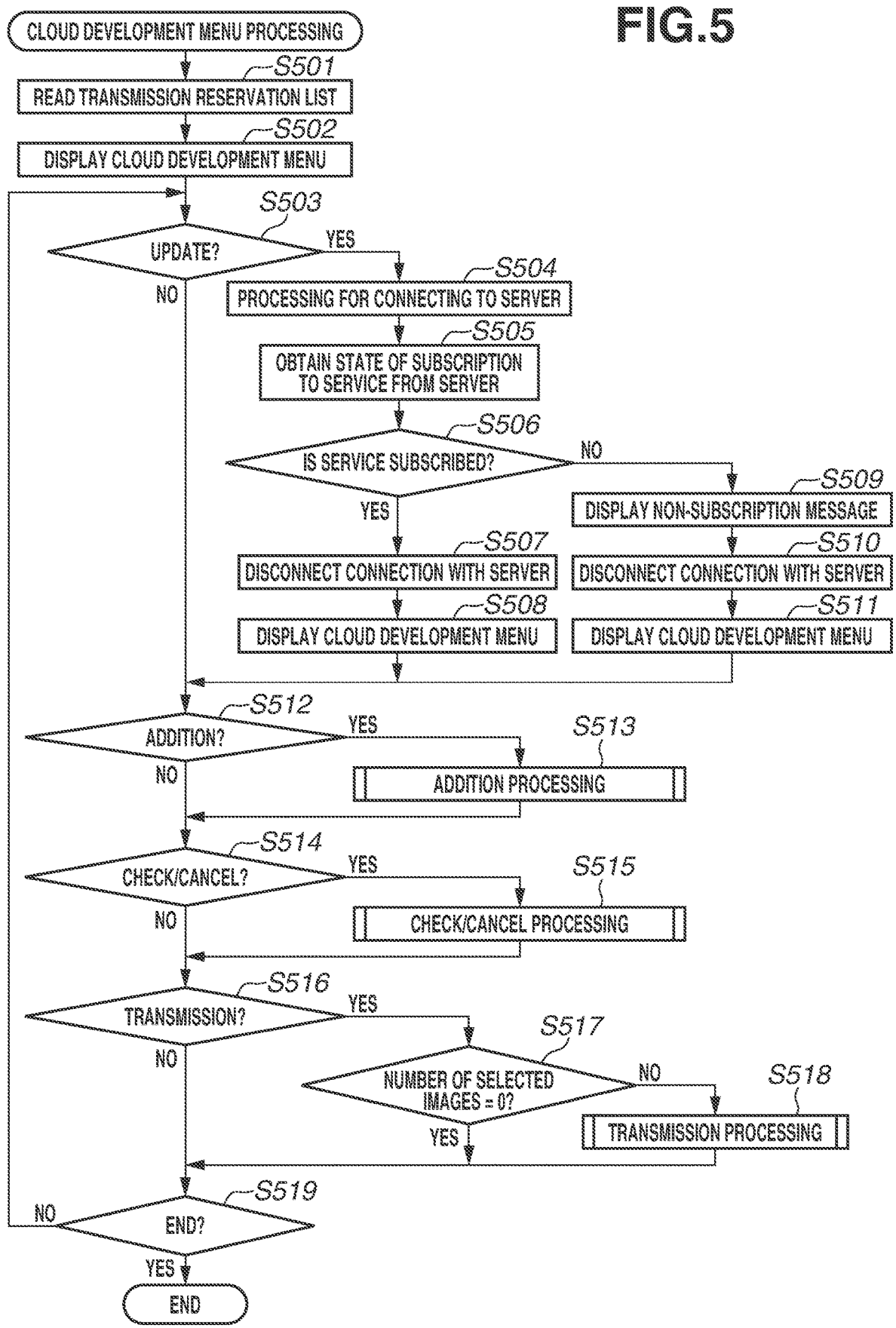
FIG. 5 is a flowchart of cloud development menu processing.

FIG. 5 is a detailed flowchart of the cloud development menu processing in step S404 of FIG. 4 described above.

In step S501, the system control unit 50 reads information registered in a transmission reservation list recorded on the recording medium 200. Specifically, the system control unit 50 reads the number of images registered in the transmission reservation list from the recording medium 200.

Figure 9B:
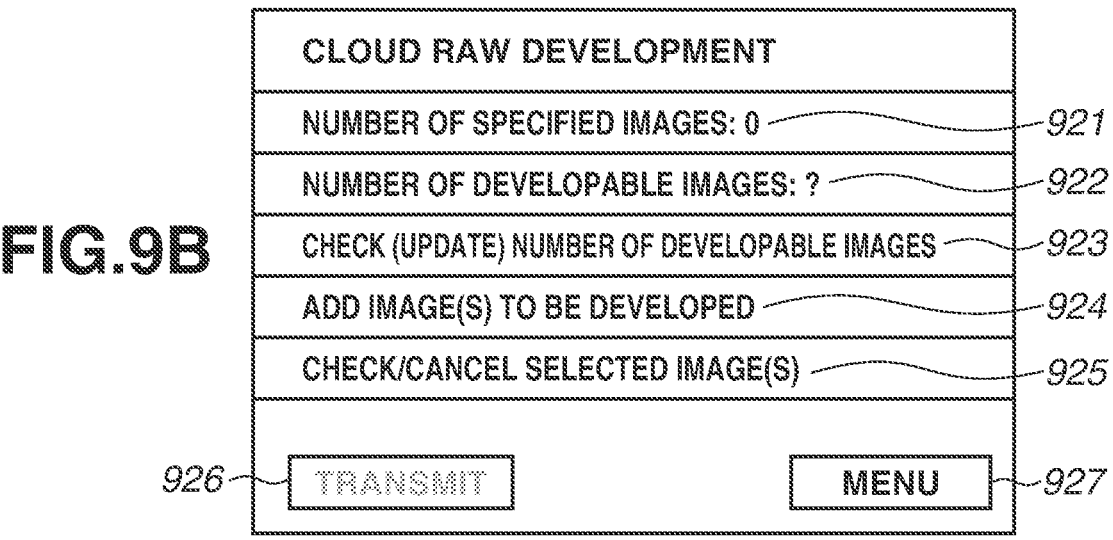
FIG. 9B illustrates a display example of a cloud development menu.

In step S502, the system control unit 50 displays a cloud development menu on the display unit 28. FIG. 9B illustrates a display example of the cloud development menu. The display contents of the cloud development menu will now be described.

A number of specified images display field 921 displays the number of images reserved and registered for the development server 303 to perform the development processing on. Here, the number of images registered in the transmission reservation list read in step S501 is displayed. If the screen transitions to this screen for the first time without a transmission reservation for cloud printing, like immediately after the purchase of the digital camera 100 or immediately after full initialization, "0" is displayed.

A number of developable images display field 922 displays the remaining number of images on which the cloud development processing can be performed by the current account. As described above, there is an upper limit to the number of images the development server 303 can be instructed to develop, like up to M images per user per month. The upper limit number is thus also displayed on the user interface of the camera 100. If the screen transitions to this screen for the first time, the number of developable images display field 922 provides display from which the number of images can be found to be unknown or not obtained yet, like "?", instead of displaying "0". The reason is that the exact number of images developable by the current account is unknown because processing for connecting to the cloud storage 301 is not performed until the playback screen transitions to this screen, for purposes such as a reduction in power consumption. Not displaying a numeral in the number of developable images display field 922 until the cloud storage 301 is connected and the information is obtained from the user setting management unit 304 prevents the user from incorrect recognition.

An update button 923 is a GUI button (display item or operation icon) for updating the number of developable images displayed in the number of developable images display field 922. If a selection and determination operation or a touch operation is made on the update button 923, processing for connecting to the cloud storage 301 is performed, and the number of developable images obtained from the user setting management unit 304 is displayed in the number of developable images display field 922.

An addition button 924 is a GUI button (display item or operation icon) for giving an instruction to select an image or images for the development server 303 to perform the developing processing on. If a selection and determination operation or a touch operation is made on the addition button 924, the screen transitions to one for adding the image(s) to be developed.

A check/cancel button 925 is a GUI button (display item or operation icon) for checking the image(s) reserved to be transmitted for the development processing by the processing of the addition button 924, or cancelling the image(s) from the transmission reservation list.

A transmission button 926 is a GUI button (display item or operation icon) for transmitting the image(s) registered in the transmission reservation list.

A return button 927 is a GUI button for returning from the cloud development menu of FIG. 9B to the playback menu screen of FIG. 9A. The return button 927 also indicates that the user can return to the playback menu screen by pressing the menu button 81 instead of directly operating the return button 927.

In step S503, the system control unit 50 determines whether the update button 923 is selected and determined. If the update button 923 is selected and determined (YES in step S503), the processing proceeds to step S504. If not (NO in step S503), the processing proceeds to step S512.

In step S504, the system control unit 50 performs processing for connecting to a server to obtain information about the upper limit of the number of images (limited number of images) up to which the development processing (cloud development processing) by the development server 303 can be used. The server here refers to at least one of the cloud storage 301, the user setting management unit 304, and the development server 303. The communication unit 54 can establish the connection by a wired connection such as Ethernet or a wireless connection such as WiFi. Communication takes place by the connection processing. When the connection processing is completed (connection is established), the digital camera 100 enters an "online state".

In step S505, the system control unit 50 obtains information about a state of subscription/non-subscription of the current account to the development processing service and, if the development processing service is subscribed, the number of developable images as well from the server (in particular, the user setting management unit 304) via the communication unit 54. The system control unit 50 stores the obtained information in the nonvolatile memory 56. In other words, the nonvolatile memory 56 stores the number of developable images if the development processing service is subscribed, and information indicating non-subscription if the development processing service is not subscribed.

In step S506, the system control unit 50 determines the state of subscription to the cloud development processing service based on the information obtained in step S505. If the service is subscribed (YES in step S506), the processing proceeds to step S507. If the service is not subscribed (NO in step S506), the processing proceeds to step S509.

In step S507, the system control unit 50 performs processing for disconnecting the connection with the server. When the connection is disconnected, the digital camera 100 enters an "offline" state.

Figure 9C:
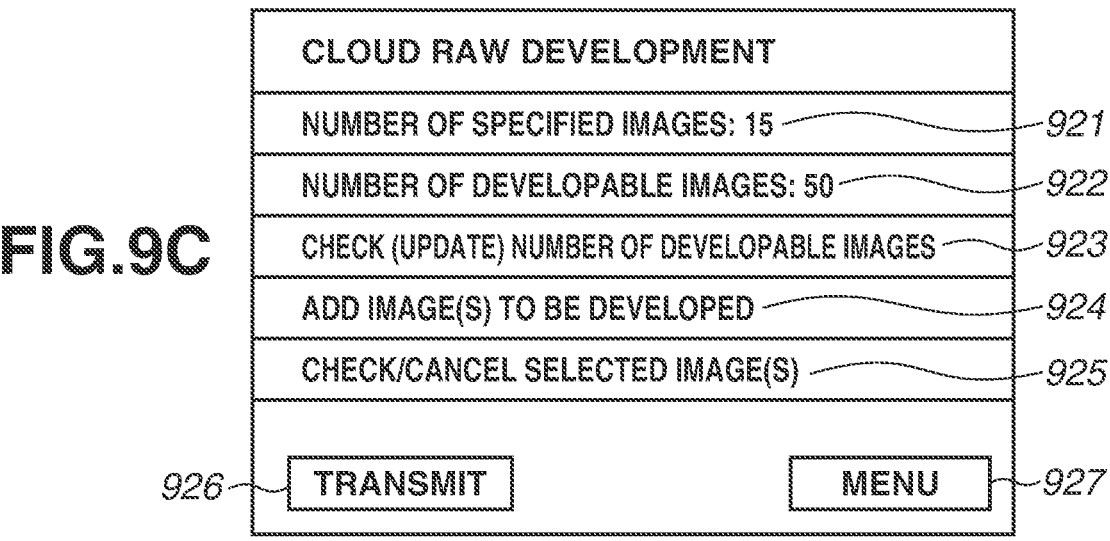
FIG. 9C illustrates a display example after update.

In step S508, the system control unit 50 displays the cloud development menu on the display unit 28 again. Here, the display of the number of developable images display field 922 is updated to display the numerical value of the number of developable images obtained in step S505. FIG. 9C illustrates a display example after the update. Assuming that the information obtained in step S505 indicates that the number of developable images is 50, the display is updated with that value. In other words, the updated number of developable images display field 922 displays 50. Here, the date and time when the information about the state of subscription to the service is obtained may be stored in the system memory 56, and the date and time when the number of images displayed in the number of developable images display field 922 is last obtained may be displayed each time the cloud development menu is displayed. This enables the user to determine whether the information is the latest or old.

Figure 9D:
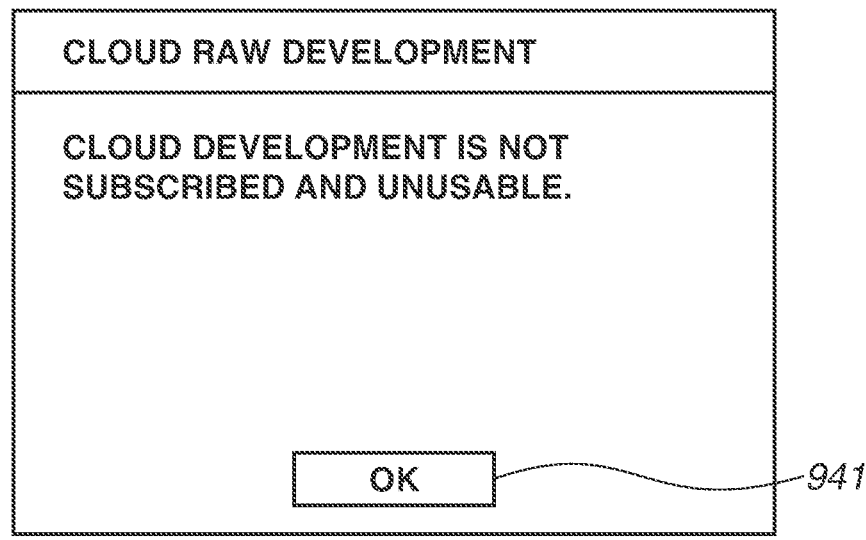
FIG. 9D illustrates a display example of a message.

In step S509, the system control unit 50 displays a message screen saying that the user is not subscribed to the cloud development processing service. FIG. 9D illustrates a display example of the message that the cloud development processing service is not subscribed. If the user checks the message and presses an OK button 941, the processing proceeds to step S510.

In step S510, like the foregoing step S507, the system control unit 50 performs the processing for disconnecting the connection with the server.

In step S511, the system control unit 50 displays the cloud development menu on the display unit 28 again. Here, the number of developable images display field 922 displays "?" (the same as the display of the number of developable images display field 922 in FIG. 9B) since the information obtained in step S505 indicates non-subscription.

In step S512, the system control unit 50 determines whether the addition button 924 is selected and determined. If the addition button 924 is selected and determined (YES in step S512), the processing proceeds to step S513. If not (NO in step S512), the processing proceeds to step S514.

In step S513, the system control unit 50 performs addition processing for adding a raw image or images to request the cloud development of (adding the raw image(s) to the transmission reservation list stored in the recording medium 200). Details of the addition processing will be described below with reference to FIG. 6.

In step S514, the system control unit 50 determines whether the check/cancel button 925 is selected and determined. If the check/cancel button 925 is selected and determined (YES in step S514), the processing proceeds to step S515. If not (NO in step S514), the processing proceeds to step S516.

In step S515, the system control unit 50 performs check/cancel processing for checking or cancelling the raw image(s) to perform the cloud development of (raw image(s) the image identification ID(s) of which are recorded in the transmission reservation list). Details of the check/cancel processing will be described below with reference to FIG. 7.

In step S516, the system control unit 50 determines whether the transmission button 926 is selected and determined. If the transmission button 926 is selected and determined (YES in step S516), the processing proceeds to step S517. If not (NO in step S516), the processing proceeds to step S519.

In step S517, the system control unit 50 determines whether the number of images specified to perform the cloud development on (the number of raw images recorded in the transmission reservation list stored in the recording medium 200) is 0. If the number of images is 0 (YES in step S517), the processing proceeds to step S519. If the number of images is not 0 (NO in step S517), the processing proceeds to step S518.

In step S518, the system control unit 50 performs transmission processing for transmitting the raw image(s) recorded in the transmission reservation list stored in the recording medium 200 to the cloud storage. Details of the transmission processing will be described below with reference to FIG. 8.

In step S519, the system control unit 50 determines whether an instruction to end the display of the cloud development menu is given (for example, the return button 927 is selected and determined, or the menu button 81 is pressed). If the instruction to end the display is given (YES in step S519), the cloud development menu processing ends. If not (NO in step S519), the processing returns to step S503.

Figure 6A:
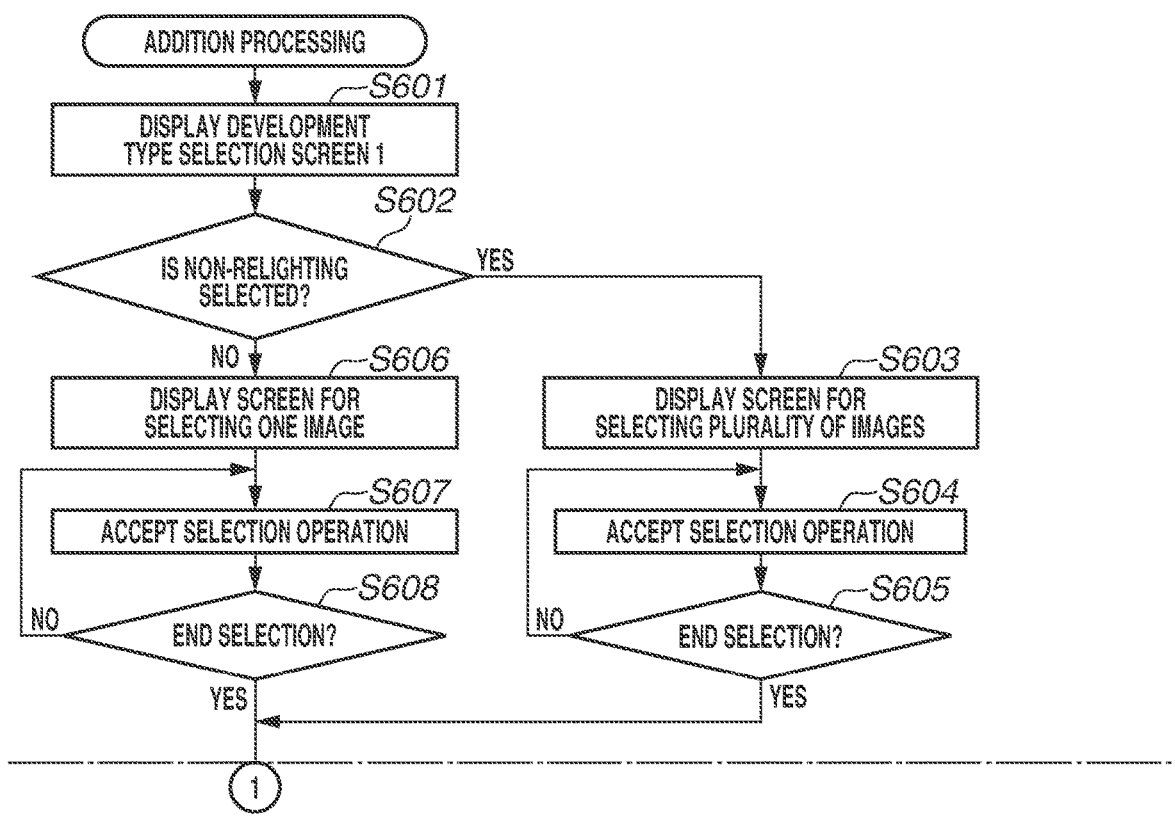
FIG. 6 is a flowchart of addition processing.
Figure 6B:
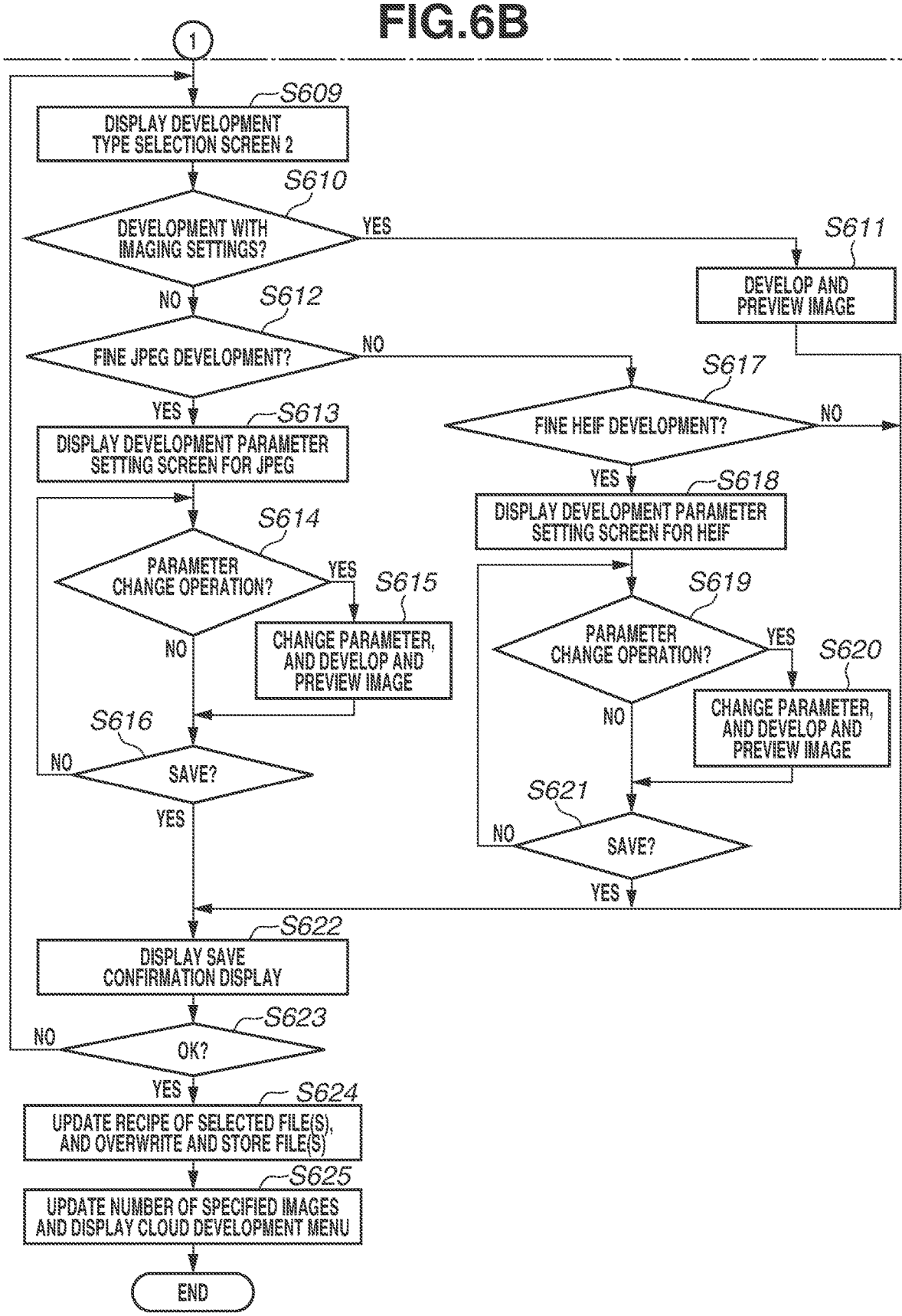

FIG. 6 is a detailed flowchart of the addition processing in step S513 of FIG. 5 described above.

In step S601, the system control unit 50 displays development type selection screen 1 on the display unit 28. Development type selection screen 1 is a menu screen capable of selecting either relighting or non-relighting. If relighting is selected, relighting parameters are made adjustable as development parameters to be adjusted, and the system control unit 50 instructs the development server 303 to perform image processing including relighting. If non-relighting is selected, no relighting parameter is presented as a development parameter to be adjusted, and the system control unit 50 instructs the development server 303 to perform image processing including no relighting. Relighting refers to processing for adjusting parameters such as the angle and intensity of virtual light applied to the face of a person in an image, or a shaded portion of the face in particular, to correct the shaded portion of the face to be brighter. Relighting is typically performed by setting different parameters for each image since shades vary object by object in images. The processing load of the relighting is high. In the present exemplary embodiment, if relighting is selected, images are permitted to be specified only one at a time. With no relighting, a plurality of images can be specified at a time.

In step S602, the system control unit 50 determines whether non-relighting is selected on development type selection screen 1. If non-relighting is selected (YES in step S602), the processing proceeds to step S603. If relighting is selected (NO in step S602), the processing proceeds to step S606.

In step S603, the system control unit 50 displays a selection screen capable of selecting a plurality of images (for example, a screen listing the thumbnail images of respective images) on the display unit 28. The display images used for this screen are each read from a Design rule for Camera File system (DCF) thumbnail part of DisplayImageData 1308 in a raw image file illustrated in FIG. 13. An image or images already selected to be developed (image(s) added to the transmission reservation list) are not displayed as selection candidates on the list screen.

In step S604, the system control unit 50 accepts an image selection operation. Specifically, the system control unit 50 performs processing for checking off an image to be developed on the foregoing list screen based on user operations. A plurality of images can be checked off.

In step S605, the system control unit 50 determines whether an instruction to end the image selection operation (selection completion instruction) is given. If the end instruction (selection completion instruction) is given (YES in step S605), the processing proceeds to step S609. If not (NO in step S605), the processing returns to step S604.

In step S606, the system control unit 50 displays a selection screen capable of selecting only one image (for example, a screen displaying one playback image) on the display unit 28. The display image used for this screen is a medium-size image read from DisplayImageData 1308 in the raw image file illustrated in FIG. 13. An image already selected to be developed (image added to the transmission reservation list) is not displayed as a selection candidate on the list screen.

In step S607, the system control unit 50 accepts an image selection operation. To select the image displayed on the display unit 28, the user issues a selection completion instruction on the image. To select an image different from the one displayed on the display unit 28, the user makes an image switch operation to switch the image displayed on the display unit 28 to another selection candidate. The user can select any one of the selection candidates by switching the images until the image to be selected is displayed.

In step S608, the system control unit 50 determines whether the instruction to end the image selection operation (selection completion instruction) is given. If the end instruction (selection completion instruction) is given (YES in step S608), the processing proceeds to step S609. If not (NO in step S608), the processing returns to step S607.

In step S609, the system control unit 50 displays development type selection screen 2 on the display unit 28. Development type selection screen 2 is a menu for selecting which to use for the image(s) selected in step S604 or S607, imaging settings or user-set parameters, as the camera-specified development parameters of the development processing server. If an option "imaging settings" to use imaging settings is selected, imaging parameters (development parameters) set at the time of imaging and recorded in the raw image file(s) are specified. There is a plurality of options for using user-set parameters with different developed file format specifications ("fine JPEG development"/"fine HEIF development"). If "fine JPEG development" is selected, a preview image is displayed and the user can freely adjust and specify development parameters usable for JPEG development. The image cloud-developed using the parameters is in a JPEG format. If "fine HEIF development" is selected, a preview image is displayed and the user can freely adjust and specify development parameters usable for HEIF development. The image cloud-developed using the parameters is in an HEIF format.

In step S610, the system control unit 50 determines whether "imaging settings" is selected and determined on development type selection screen 2. If "imaging settings" is selected and determined (YES in step S610), the processing proceeds to step S611. If not (NO in step S610), the processing proceeds to step S612.

In step S611, the system control unit 50 performs temporary development with the imaging settings and provides a preview display on the display unit 28. Specifically, the system control unit 50 reads RecParameter 1305 illustrated in FIG. 13 from the selected raw image file, and performs development processing on ImageData 1309 which is raw data (undeveloped image). The system control unit 50 then displays the image resulting from the developing processing on the display unit 28 as a preview image. The user can check what the outcome of the development looks like on the display unit 28 before transmission to the development processing server. Note that the result of the development by the development processing server is not exactly the same as the preview display, since advanced image processing is also applied by the development processing server. The processing proceeds to step S622.

In step S612, the system control unit 50 determines whether "fine JPEG development" is selected and determined on development type selections screen 2. If "fine JPEG development" is selected and determined (YES in step S612), the processing proceeds to step S613. If not (NO in step S612), the processing proceeds to step S617.

In step S613, the system control unit 50 displays a development parameter setting screen for generating a JPEG file on the display unit 28.

Figure 10:
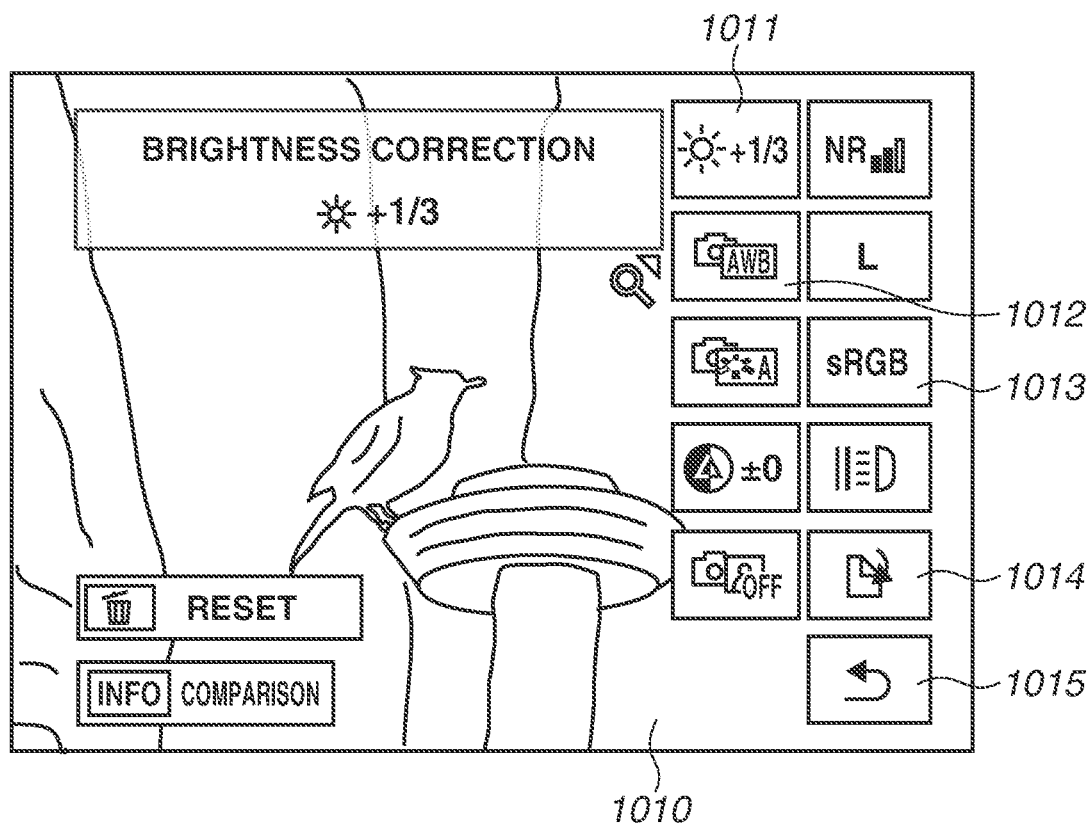
FIG. 10 illustrates a display example of a development parameter setting screen.

FIG. 10 illustrates a display example of the development parameter setting screen. The development parameter setting screen displays a plurality of display items (icons) corresponding to respective types of user-adjustable development parameters along with a preview image 1010. For example, brightness can be changed by selecting an icon 1011, white balance by selecting an icon 1012, and color space parameters by selecting an icon 1013. The icons corresponding to the respective types of development parameters indicate the setting vales currently set for the types of development parameters. The user can select one of the plurality of icons corresponding to the types of development parameters (for example, move a selection cursor using the directional pad 74) and make an adjustment operation (for example, operate the main electronic dial 71) to adjust the selected type of parameter. The development parameter setting screen provides a preview display for the first time by performing the development processing with the imaging settings like step S611. If a plurality of raw image files is selected in step S605 described above, the image file of the earliest imaging date and time among the selected image files is developed with the imaging settings and displayed on the display unit 28.

In step S614, the system control unit 50 determines whether an operation for adjusting one of the adjustable types of development parameters (parameter change operation) is made on the development parameter setting screen. If a change operation is made (YES in step S614), the processing proceeds to step S615. If not (NO in step S614), the processing proceeds to step S616.

In step S615, the system control unit 50 changes the development parameter based on the change operation. In the present exemplary embodiment, the changed development parameter is recorded in the system memory 52 in step S615. However, as in step S624 to be described below, the recipe of the raw image file may be updated with the changed development parameter. The system control unit 50 also performs the development processing for a preview display based on the changed development parameter. For example, if the icon 1011 is selected and a change operation is made to increase the brightness by one step, the system control unit 50 performs developing processing on Image-Data 1309 which is the raw data (undeveloped image) to increase the brightness by one step. The system control unit 50 then updates the preview image 1010 with the image developed by this development processing. The visual impression of the outcome can thus be checked in step S615 as well, before transmission to the development processing server.

In step S616, the system control unit 50 determines whether an instruction to save the development parameter adjusted (changed) on the development parameter setting screen is given. If the save instruction is given (for example, a save button 1014 displayed on the development parameter setting screen is selected and determined) (YES in step S616), the processing proceeds to step S622. If not (NO in step S616), the processing returns to step S614.

In step S617, the system control unit 50 determines whether "fine HEIF development" is selected and determined on development type selection screen 2. If fine HEIF development" is selected and determined (YES in step S617), the processing proceeds to step S618. If not (NO in step S617), the processing proceeds to step S622.

In step S618, the system control unit 50 displays a development parameter setting screen for generating an HEIF file on the display unit 28. The development parameter setting screen for HEIF is similar to that illustrated in FIG. 10 described above. Examples of the changeable development parameters include brightness and white balance. Unlike when generating a JPEG file, changes to some types of parameters may be restricted. For example, the color space parameters may be fixed to predetermined values. At least one of the types of changeable (adjustable) development parameters may be different between JPEG and HEIF.

The processing of steps S619 to S621 is similar to that of steps S614 to S616 described above. A description thereof will thus be omitted.

In step S622, the system control unit 50 displays a message for confirming whether to save the current content (selected image and adjusted development parameter), an OK button for determining to save the content, and a cancel button for cancelling the adjustment on the display unit 28.

In step S623, the system control unit 50 determines whether the OK button for determining to save the content is selected on the message display screen displayed in step S622. If the OK button is selected and determined (YES in step S623), the processing proceeds to step S624. If the cancel button is selected and determined (NO in step S623), the processing returns to step S609.

In step S624, the system control unit 50 performs processing for saving the current content (selected image and adjusted parameter). Specifically, the system control unit 50 records an image identification ID (such as a filename and a unique ID) indicating the selected raw image file into the transmission reservation list stored in the recording medium 200 as information indicating the image reserved to be transmitted. The system control unit 50 also overwrites a RecipeData 1306 part to be described below with reference to FIG. 13 in the selected raw image file recorded on the recording medium 200 with the adjusted set of development parameters as information to be used when the development server 303 performs the development processing. If a plurality of images is selected, the processing for overwriting and saving RecipeData 1306 is performed on each of the raw image files. For example, if 15 images are selected and determined in step S605, brightness is increased by one step in step S615, and OK is selected in step S623, the system control unit 50 successively overwrites the RecipeData 1306 areas in the selected 15 raw image files with the information of brightness+1 and stores the overwritten RecipeData 1306 areas. The system control unit 50 then stores the image identification IDs of the 15 images in the transmission reservation list.

In step S624, the system control unit 50 overwrites only the RecipeData 1306 part of each raw image file selected. This can prevent the raw image file 1300 from changing in the data volume. Here, the system control unit 50 does not update DisplayImageData (1308) and maintains DisplayImageData (1308) not reflecting the adjusted set of development parameters. The reasons are as follows: DisplayImageData (1308) is unable to be undone once overwritten and stored based on the image developed with the adjusted set of development parameters. Storing the image developed with the adjusted set of development parameters into another area of the raw image file 1300 increases the volume of the raw image file 1300. The adjusted set of development parameters is, in a strict sense, not reflected, since advanced types of development processing that can only be performed by cloud developing processing are unable to be reflected.

In step S625, the system control unit 50 updates the number of specified images display field 921 based on the transmission reservation list stored in step S624, and displays the cloud development menu on the display unit 28. For example, if 15 images are added to and listed in the transmission reservation list, the number of specified images display field 921 is updated to display "15".

Figure 7:
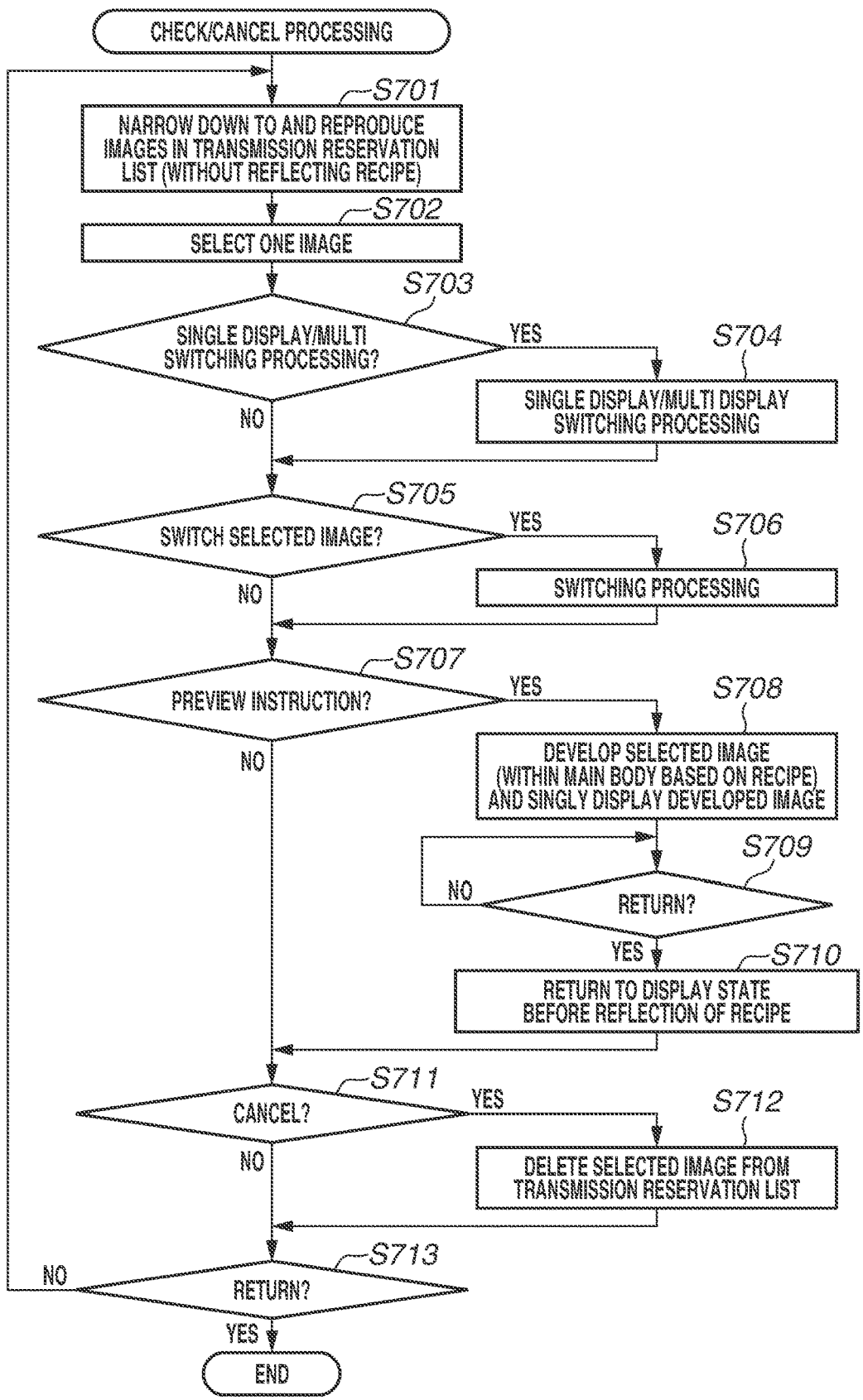
FIG. 7 is a flowchart of check/cancel processing.

FIG. 7 is a detailed flowchart of the check/cancel processing in step S515 of FIG. 5 described above.

In step S701, the system control unit 50 lists reserved images on the display unit 28 by narrowing down to those recorded as reserved to be transmitted in the transmission reservation list recorded on the recording medium 200.

Figure 11A:
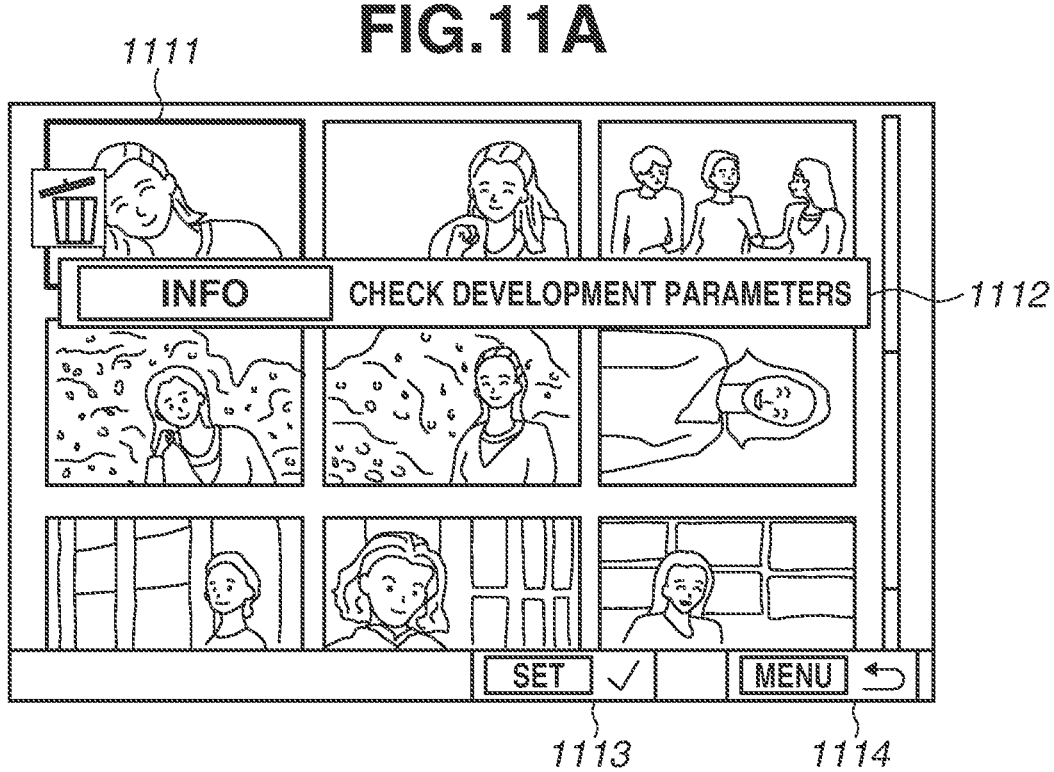
FIG. 11A illustrates a display example of a list display of reserved images.

FIG. 11A illustrates a display example of the list of reserved images displayed in step S701. For example, if 15 images are recorded as reserved in the transmission reservation list, the system control unit 50 reads a thumbnail display image from DisplayImageData 1308 of each of the reserved 15 raw image files, and lists the thumbnail images. The thumbnail images displayed here are not ones obtained by developing ImageData 1309 with the development parameters adjusted in adding the images to the transmission reservation list, and the user-specified development parameters are not reflected. The list screen displays a cursor 1111 for image selection, an operation guide 1112, a button 1113, and a button 1114 along with the plurality of thumbnail images. The operation guide 1112 is one indicating that an instruction for providing a preview display and checking the adjustment parameters (development parameters) stored in adding the images to the transmission reservation list can be made by pressing an INFO button included in the operation unit 70. The button 1113 is a GUI button for accepting an instruction to perform cancel processing on the transmission reservation list, and also serves as an operation guide indicating that the instruction to perform the cancel processing on the transmission reservation list can also be issued by pressing the set button 75. The button 1114 is a GUI button for accepting an instruction to return to the previous screen, and also serves as an operation guide indicating that the instruction to return to the previous screen can also be issued by pressing the menu button 81.

In step S702, the system control unit 50 performs processing for selecting an image. The cursor 1111 is initially located at the top left of the list screen, i.e., the oldest image.

In step S703, the system control unit 50 determines whether an operation for switching between a single display and a multi display (list display) is made on the list display. If the switching operation is made (YES in step S703), the processing proceeds to step S704. If not (NO in step S703), the processing proceeds to step S705.

In step S704, the system control unit 50 performs processing for switching to a single display or a multi display. If the display before switching is a list display and an operation for switching to a single display (pinch-in or the pressing of the AE lock button 77) is made, the display is switched to the single display of the raw image where the cursor 1111 is located before the switching. In the single display, the system control unit 50 reads the medium-size image in DisplayImageData 1308 of the raw image file to be displayed, and displays the medium-size image on the display unit 28. If the display before switching is a single display and an operation for switching to a multi display (pinch-out or the pressing of the zoom button 78) is made, the system control unit 50 switch to a list display and displays the cursor 1111 on the thumbnail image corresponding to the image singly displayed before the switching. In the list display, the system control unit 50 reads the thumbnail image in DisplayImageData 1308 of each raw image file, and displays the thumbnails.

In step S705, the system control unit 50 determines whether an operation for switching the selected image is made. In the list display state, this operation refers to an operation for moving the cursor 1111 up, down, to the left, or to the right. In the single display state, the operation refers to an image scroll operation. Either operation can be made by operating the directional pad 74, etc. If the operation for switching the selected image is performed (YES in step S705), the processing proceeds to step S706. If not (NO in step S705), the processing proceeds to step S707.

In step S706, the system control unit 50 performs switching processing. In the list display state, this processing refers to an operation for moving the cursor 1111 in the operated direction. In the single display state, the processing refers to an operation for switching to the previous or next image. The reserved images recorded in the transmission reservation list can thereby selected in order.

In step S707, the system control unit 50 determines whether a preview instruction operation (such as the pressing of the INFO button indicated by the operation guide 1112) is made. If the preview instruction operation is made (YES in step S707), the processing proceeds to step S708. If not (NO in step S707), the processing proceeds to step S711.

In step S708, the system control unit 50 develops the selected image (in the list display state, the image in the cursor 1111; in the single display state, the image displayed on the display unit 28) and singly displays the developed image. Specifically, the system control unit 50 reads development parameter information not from RecParameter 1305 of the selected raw image file but from RecipeData 1306 where the development parameters adjusted in adding the image to the transmission reservation list are recorded. The system control unit 50 then displays (previews) the image obtained by performing development processing on Image-Data 1309 which is the raw data (undeveloped image) using the development parameters on the display unit 28 as a preview image.

Figure 11B:
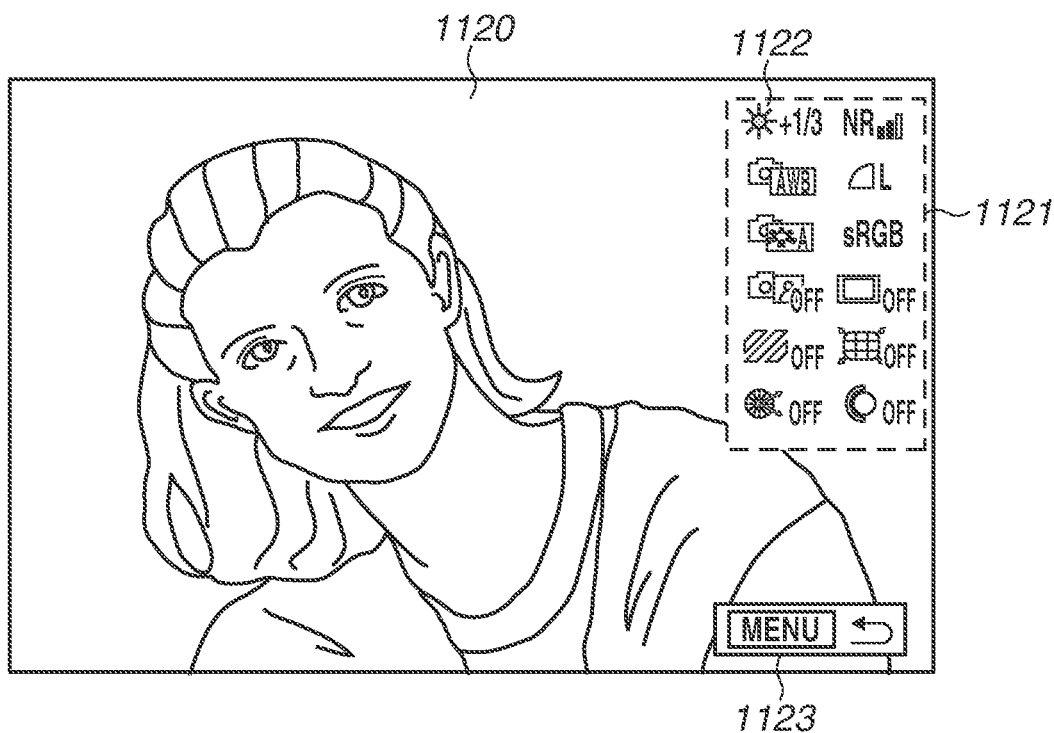
FIG. 11B illustrates a display example of a preview display.

FIG. 11B illustrates a display example of the preview display in step S708. A preview image 1120 is an image reflecting the development parameters adjusted in adding the image to the transmission reservation list (image developed with the development parameters). The preview image 1120 is not exactly the same as the image that is cloud-developed with the development parameters adjusted in adding the image to the transmission reservation list, since the cloud raw development includes advanced development processing. Information 1121 (area surrounded by the dotted line) about a group of development parameters obtained from RecipeData 1306 of the displayed raw image file is displayed together with the preview image 1120. A type or types of development parameters changed from the imaging settings are displayed in a different display mode (for example, different color) from other types of development parameters so that the presence of a change is identifiable. In the illustrated example, information 1122 representing a brightness development parameter is displayed in a manner distinguishable from the other information. This indicates that only the brightness has been changed from the imaging settings. The preview display also displays a button 1123. The button 1123 is a GUI button for accepting an instruction to end the preview state and return to the previous screen, and also serves as a guide indicating that the previous screen can also be restored by pressing the menu button 81.

In step S709, the system control unit 50 determines whether an operation for giving an instruction to return is made (the button 1123 is selected and determined or the menu button 81 is pressed). If the operation for giving an instruction to return is made (YES in step S709), the processing proceeds to step S710. If not (NO in step S709), the processing returns to step S709.

In step S710, the system control unit 50 restores the display state before the reflection of the development parameters. In other words, the system control unit 50 restores the display state before the acceptance of the preview instruction in step S707.

In step S711, the system control unit 50 determines whether a cancel operation that is an instruction to perform cancel processing is made (the button 1113 is selected and determined or the set button 75 is pressed). If the cancel operation is made (YES in step S711), the processing proceeds to step S712. If not (NO in step S711), the processing proceeds to step S713.

In step S712, the system control unit 50 cancels the reservation of the currently selected image (in the multi display, the image where the cursor 1111 is located; in the single display, the displayed image) in the transmission reservation list. As a result, either the image identification ID of the selected image is deleted from the transmission reservation list recorded on the recording medium 200, or information indicating that the selected image is not reserved (reservation-cancelled) is recorded into the transmission reservation list. Moreover, the system control unit 50 deletes the information about RecipeData 1306 in the raw image file of the selected image. The development parameters adjusted by the user in adding the image to the transmission reservation list are thereby discarded. Images may be selectable together instead of singly. With the cancellation processing performed, the foregoing number of specified images display field 921 displays the number that is the number of cancelled images less next time the cloud development menu is displayed.

In step S713, the system control unit 50 determines whether a return operation is made (the button 1114 is selected and determined or the menu button 81 is pressed). If the return operation is made (YES in step S713), the check/cancel processing of FIG. 7 ends, and the screen returns to the cloud development menu. If not (NO in step S713), the processing turns to step S701. If the cancel processing is performed in step S712 and the screen returns to the cloud development menu, the number of images displayed in the number of specified images display field 921 is updated.

Figure 8:
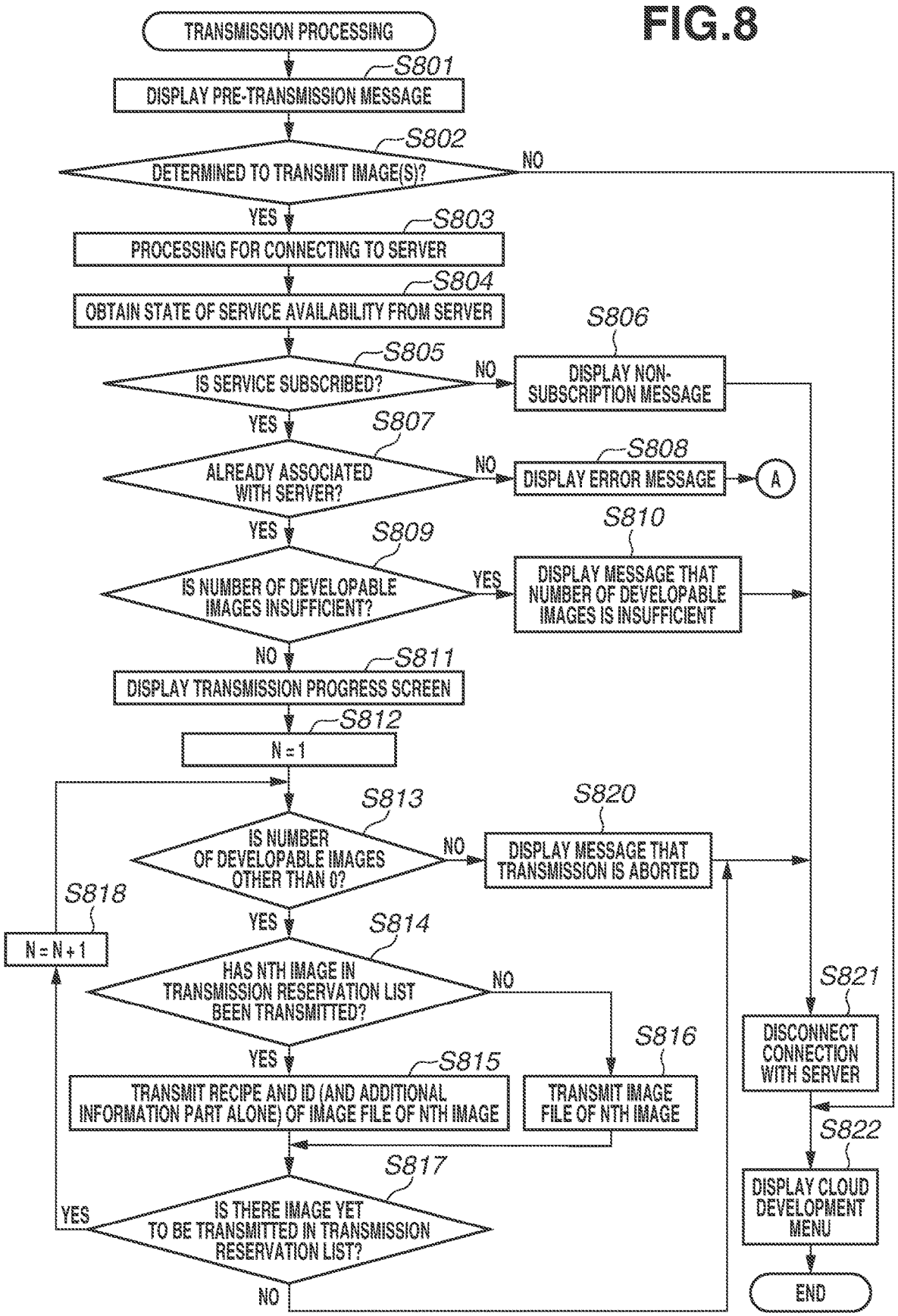
FIG. 8 is a flowchart of transmission processing.

FIG. 8 is a detailed flowchart of the transmission processing in step S518 of FIG. 5 described above.

In step S801, the system control unit 50 displays a pre-transmission confirmation message (guidance) on the display unit 28 before connection to the server.

Figure 12A:
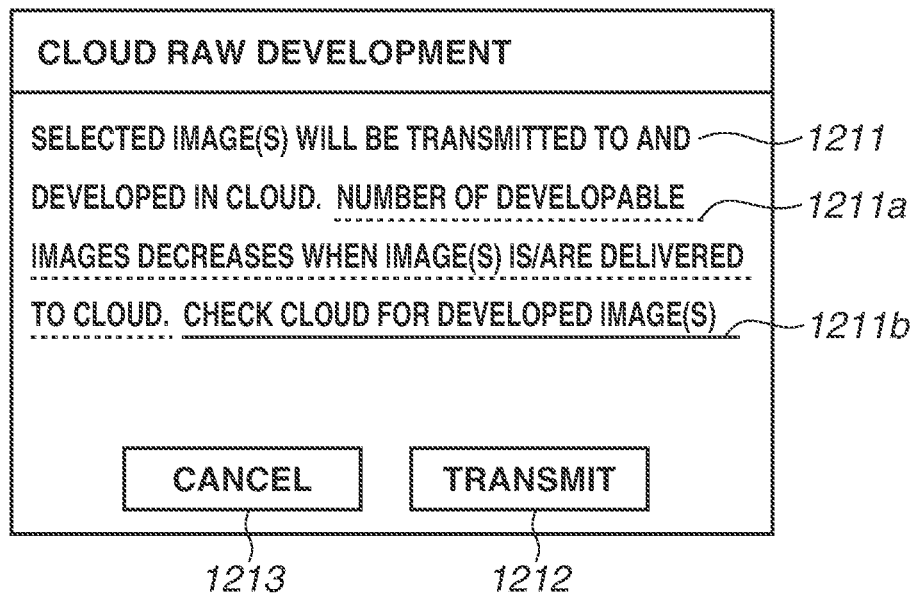
FIG. 12A illustrates a display example of a message.

FIG. 12A illustrates a display example of the pre-transmission confirmation message displayed in step S801. The displayed screen includes a confirmation message 1211, a transmission button 1212 for giving an instruction to transmit the image(s) after reading the confirmation message, and a cancel button 1213 for giving an instruction to cancel the transmission after reading the confirmation message. The confirmation message 1211 includes a message that the image(s) registered in the transmission reservation list is/are transmitted to the cloud storage 301 if the transmission button 1212 is selected and determined.

The confirmation message 1211 also includes a message 1211a that the number of developable images (the number displayed in the number of developable images display field 922) decreases by the number of transmitted images once the transmission is completed. In other words, the message 1211a notifies the user that the remaining number of images to the limited number of times M the image processing by the image processing server can be used will decrease due to the transmission of the information for giving an instruction for the cloud development processing, regardless of the remaining number of times to the limited number of times M. The message 1211a refers to the part underlined by the dotted line (the underline is not actually displayed). In the illustrated example, the displayed message 1211a is "NUMBER OF DEVELOPABLE IMAGES DECREASES ONCE IMAGE(S) IS/ARE DELIVERED TO CLOUD". The message 1211a is not limited thereto, and a message that the number of developable images is limited per account or that the number of developable images is obtainable on a paid basis may be displayed. Examples may include the following: "NUMBER OF DEVELOPABLE IMAGES DECREASES WHEN IMAGE(S) IS/ARE DELIVERED TO SERVER. NUMBER OF DEVELOPABLE IMAGES WILL NOT INCREASE UNTIL NEXT MONTH", "PURCHASED NUMBER OF DEVELOPABLE IMAGES DECREASES WHEN IMAGE(S) IS/ARE DELIVERED TO SERVER", and "NUMBER OF DEVELOPABLE IMAGES DECREASES WHEN IMAGE(S) IS/ARE DELIVERED TO SERVER. NUMBER OF DEVELOPABLE IMAGES CAN BE INCREASED BY PURCHASE". Such a guidance display can notify the user before the image transmission that the number of developable images decreases when the cloud raw development processing is performed. This enables the user perform the cloud raw development processing in a well-planned manner and avoid the risk of inconvenience. For example, this can prevent a situation where the number of images developable by the cloud development processing is first used up on images of low priority and the cloud development processing is unable to be performed on images of high priority to be transmitted later.

The confirmation message 1211 also includes a message 1211b that the result of the development processing by the development server 303 is to be checked on a device other than the digital camera 100, such as the smartphone 302 (that browsing using another device is recommended). The message 1211b refers to the part underlined by the solid line (the underline is not actually displayed). In the illustrated example, "CHECK CLOUD FOR DEVELOPED IMAGE(S)" is displayed. The message 1211b is not limited thereto, and a message that the result can be checked by connecting to the cloud storage 301 from a device other than the digital camera 100 may be displayed. A message that the result is to be checked by connecting to the cloud storage 301 from a device other than the digital camera 100 with the user account where the digital camera 100 and the cloud storage 301 are associated with each other may be displayed. The devices other than the digital camera 100 may include at least one of a smartphone, a personal computer, and a tablet terminal. A message that the developed image(s) to which the cloud development processing is applied (processed image(s)) is/are unable to be immediately checked on the display unit 28 of the digital camera 100 may be displayed. Examples of the messages may include the following: "TO CHECK DEVELOPED IMAGE(S), LOG IN TO ACCOUNT SUBSCRIBED TO SERVICE USING SMARTPHONE, PERSONAL COMPUTER, OR TABLET TERMINAL" AND "TO CHECK DEVELOPED IMAGE(S), CONNECT TO CLOUD SERVICE FROM DEVICE OTHER THAN THIS CAMERA". A message that the developed image(s) is/are unable to be immediately checked may be added. Examples include: "DEVELOPMENT PROCESSING TAKES TIME. PLEASE CHECK LATER" and "PLEASE CHECK AFTER RECEPTION OF DEVELOPMENT PROCESSING COMPLETION NOTIFICATION". In the present exemplary embodiment, the digital camera 100 receives no developed image to which the cloud development processing is applied by the development server 303 and that is recorded in the cloud storage 301. However, the message 1211b informs the user that the processing result is stored in a location other than the digital camera 100 that is the transmission source, and enables the user to check the developed image(s) on another device without confusion.

In step S802, the system control unit 50 determines whether an operation for determining to transmit the image(s) is made with the confirmation message of FIG. 12A displayed (the transmission button 1212 is selected and determined or the set button 75 is pressed). If the operation for determining to transmit the image(s) is made (YES in step S802), the processing proceeds to step S803. On the other hand, if a cancel operation is made (the cancel button 1213 is selected and determined or the menu button 81 is pressed) (NO in step S802), the processing proceeds to step S822.

In step S803, like step S504, the system control unit 50 performs the processing for connecting to the server (at least one of the cloud storage 301, the user setting management unit 304, and the development server 303). When the connection processing is completed (connection is established), the digital camera 100 enters the "online state".

In step S804, like the foregoing S505 described above, the system control unit 50 obtains the state of subscription/non-subscription to the development processing service of the current account and, if the development processing service is subscribed, information about the number of developable images as well from the server (in particular, the user setting management unit 304). In step S804 of the transmission processing, the information obtained in the processing for displaying the cloud development menu is obtained again. The reason is that the number of images developable by the cloud development processing with the same user ID (account) may have changed due to factors other than development instructions from the digital camera 100. Examples of the changing factors include the following: The number of developable images may have decreased due to issuance of a development request to the development server 303 from another device associated with the same user ID (account) other than the camera 100. In the case of a subscription service with a set number of developable images per month, the number of developable images may have increased due to start of a new month. The development processing service may have been terminated (unsubscribed). The association setting between the digital camera 100 and the cloud storage 301 may have been cancelled. Since the situation may have changed due to such factors, the occurrence of errors after start of transmission can be reduced by obtaining the latest information before the transmission.

In step S805, the system control unit 50 makes a similar determination to that in the foregoing step S506. If the service is subscribed (YES in step S805), the processing proceeds to step S807. If the service is not subscribed (NO in step S805), the processing proceeds to step S806. In step S806, like the foregoing step S509, the system control unit 50 displays the message screen indicating that the user is not subscribed to the cloud development processing service on the display unit 28. The processing proceeds to step S821.

In step S807, like step S403, the system control unit 50 determines whether the digital camera 100 and the cloud storage 301 have been associated (paired). If the digital camera 100 and the cloud storage 301 have been associated (YES in step S807), the processing proceeds to step S809. If the digital camera 100 and the cloud storage 301 have not been associated (i.e., association has been cancelled) (NO in step S807), the processing proceeds to step S808. In step S808, the system control unit 50 displays an error message that the association has been cancelled on the display unit 28. The processing returns to step S401.

In step S809, the system control unit 50 determines whether the number of developable images is insufficient for the number of images to be transmitted (the number of images registered in the transmission reservation list). If the number of developable images is insufficient (YES in step S809), the processing proceeds to step S810. If not (NO in step S809), the processing proceeds to step S811.

Figure 12B:
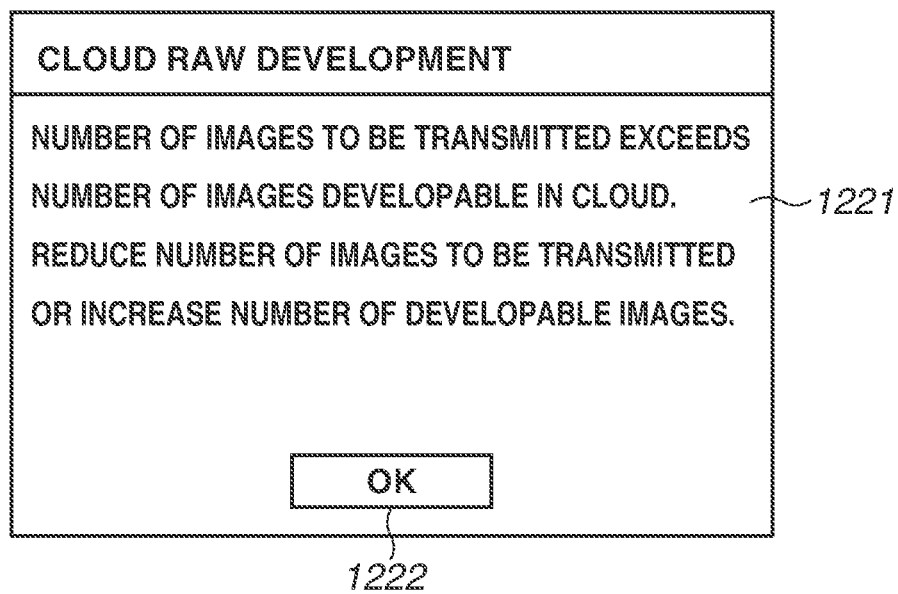
FIG. 12B illustrates a display example of a message.

In step S810, the system control unit 50 displays a message (guidance) that the number of developable images is insufficient on the display unit 28. FIG. 12B illustrates a display example of the message that the number of developable images is insufficient, displayed in step S810. A confirmation message 1221 notifies the user that the images to be transmitted exceed the number of images on which the development server 303 can perform the development processing. The confirmation message 1221 may include content for prompting the user to reduce the images to be transmitted. If the development processing service is a paid one, the confirmation message 1221 may include content for prompting the user to increase the number of developable images. The system control unit 50 also displays an OK button 1222 for proceeding to the next screen. The processing proceeds to step S821.

In step S811, the system control unit 50 displays a progress screen indicating that the transmission is in process on the display unit 28. For example, a progress display like "the number of transmitted images/the total number of images to be transmitted" or a progress display like "percentage display" may be provided.

In step S812, the system control unit 50 initializes a variable N indicating the number of images transmitted after the determination to transmit the image(s) to 1, and stores N=1 in the system memory 52.

In step S813, the system control unit 50 determines whether there is some number of developable images. Specifically, the system control unit 50 obtains the number of images developable by the cloud development by the current account from the user setting management unit 304 again, and determines whether the number is zero. If the number of developable images is other than zero (greater than zero) (YES in step S813), the processing proceeds to step S814. If not (zero) (NO in step S813), the processing proceeds to step S820.

In step S814, the system control unit 50 determines whether the Nth image in the transmission reservation list has already been transmitted to the cloud storage 301. This determination is made in the following manner. First, the digital camera 100 transmits the image identification ID (unique ID uniquely assigned image by image) of the Nth image in the transmission reservation list to the cloud storage 301 and inquires whether the image main body has been transmitted. The cloud storage 301 in response searches for a stored image matching the transmitted image identification ID. If the matching image is found, the cloud storage 301 transmits to the digital camera 100 a notification that the image has already been transmitted to the cloud storage 301. If no matching image is found, the cloud storage 301 transmits to the digital camera 100 a notification that the image is yet to be transmitted to the cloud storage 301. If the notification that the image has been transmitted is received as a response to the inquiry to the cloud storage 301, the system control unit 50 determines that the image has been transmitted. If the notification that the image is yet to be transmitted is received as a response to the inquiry to the cloud storage 301, the system control unit 50 determines that the image is yet to be transmitted (has not been transmitted). If the image has been transmitted (YES in step S814), the processing proceeds to step S815. If the image is yet to be transmitted (NO in step S814), the processing proceeds to step S816. Such a determination can prevent multiple transmission of the same image to the cloud storage 301 and reduce communication time, communication power, and communication capacity due to the multiple transmission. For example, aside from the function of transmitting the image for the purpose of using the cloud development service, the digital camera 100 may have a function of automatically transmitting a captured image to the cloud storage 301 for the purpose of storage after image capturing. If such a function is used, the same raw image file can be already stored in the cloud storage 301. If the digital camera 100 has such a plurality of functions related to image transmission, the determination of step S814 can prevent multiple transmission of the same file.

In step S815, the system control unit 50 performs processing for transmitting the image identification ID of the Nth image in the transmission reservation list and the development parameter information and additional information in the raw image file having the image identification ID as information for giving an instruction about the cloud development processing. Specifically, the system control unit 50 extracts only RecipeData 1306 and OtherMetaData 1307 in the raw image file that is captured by the imaging unit 22 and recorded on the recording medium 200, links RecipeData 1306 and OtherMetaData 1307 with the image identification ID, and transmits the resultant from the communication unit 54 to the cloud storage 301. In step S815, the system control unit 50 does not transmit at least ImageData 1309 which is the raw data (image before raw development) in the raw image file. This prevents redundant data transmission.

In step 816, the system control unit 50 transmits the entire raw image file 1300 of the Nth image in the transmission reservation list from the communication unit 54 to the cloud storage 301 as information for giving an instruction about the cloud development processing. The raw image file 1300 to be transmitted is one captured by the imaging unit 22 and recorded on the recording medium 200. For the sake of consistency of the processing sequence during transmission, RecipeData 1306 and OtherMetaData 1307 in the raw image file 1300 may be extracted as in step S815 and transmitted with the entire raw image file 1300.

In step S817, the system control unit 50 determines whether there is an image yet to be transmitted in the transmission reservation list. Specifically, the system control unit 50 determines whether the total number Nmax of images in the transmission reservation list (the same as the number of images displayed in the number of specified images display field 921) satisfies the relationship N<Nmax. If there is an image yet to be transmitted (the relationship N<Nmax is satisfied) (YES in step S817), the processing proceeds to step S818. If there is no image yet to be transmitted (the relationship N<Nmax is not satisfied) (NO in step S817), the processing proceeds to step S821 since all the images registered in the transmission reservation list have been transmitted. In such a case, the system control unit 50 may display a message indicating the completion of the transmission on the display unit 28 before ending the transmission processing. The number of developable images display field 922 displayed on the cloud development menu in step S822 to be described below displays the number that is the number of transmitted images less.

In step S818, the system control unit 50 increments the number N of transmitted images. The processing proceeds to step S813 and the system control unit 50 performs processing for transmitting the next image.

In step S820, the system control unit 50 displays a message that the image transmission is aborted because the next image transmission exceeds the number of developable images on the display unit 28. At N=1, this message is displayed if another device linked with the same user ID causes the development server 303 to perform the development processing almost at the same timing as the operation for settling on the transmission. At N=2 or more, the message is displayed if another device linked with the same user ID causes the development server 303 to perform the development processing between the operation for settling on the transmission and the completion of the transmission.

In step S821, the system control unit 50 performs processing for disconnecting the connection with the server. When the connection is disconnected, the digital camera 100 enters the "offline state".

In step S822, the system control unit 50 displays the cloud development menu described with reference to FIG. 9B or 9C. The number of specified images display field 921 and the number of developable images display field 922 are updated and displayed based on the situation immediately before the disconnection of the connection in step S821.

FIG. 13 illustrates the structure of a raw image data (still image data) recorded on the recording medium 200. The structure of the raw image file will now be described in detail.

The file format of the raw image file is an International Organization for Standardization (ISO) base media file format defined by the ISO/International Electrotechnical Commission (IEC) 14496-12. This file format thus has a tree structure and includes nodes called boxes. Each box can include a plurality of boxes as child elements.

The raw image file 1300 includes a box ftyp 1301 for describing a file type at the top, a box moov 1302 containing all meta data, and a box mdat 1303 that is the media data main body of the track. The foregoing box moov 1302 includes, as a child element, a box uuid 1304 storing MetaData. The MetaData describes meta data on the image.

For example, the MetaData includes the following information:
  Information about the date and time of generation of the image
  RecParameter 1305 which is imaging setting information
  RecipeData 1306 which is information (group of development parameters) needed when the development server 303 performs the development processing
  OtherMetaData 1307 which is other imaging information
  OtherMetaData 1307 may include detection information about a human face, eyes, and nose to be used for the development processing by the development server 303 including relighting correction processing, for example. The detection information can basically be obtained during imaging, but can also be detected in performing the development processing for preview in the foregoing steps S615 and S620, etc. If the detection information is detected during the development processing for preview, the detection information is stored in OtherMetaDtata 1307 during preview. The foregoing box mdat 1303 includes, as child elements, ImageData 1309 which is raw data itself on the captured still image data and DisplayImageData 1308 which is a display image.

DisplayImageData 1308 that is a display image has a size smaller than that of ImageData. DisplayImageData 1308 is recorded in a Multi-Picture Format (MPF) and includes a medium-size image and a DCF thumbnail image that has a size smaller than that of the medium-size image and used in a list display. The file format described in the present exemplary embodiment is just an example, and other boxes may be included as needed.

The configuration of the system for providing the cloud development service and the flow of the development processing according to the present exemplary embodiment have been described above.

Of these, characteristic configurations and processes will now be described in a supplementary manner. The characteristic configurations and processes are basically independent of each other, and can singly provide their respective effects.

In the foregoing exemplary embodiment, the digital camera 100 is described to not receive the developed images to which the cloud development processing by the development server 303 is applied, and the result of the cloud development processing is unable to be checked on the digital camera 100. The reason for such a configuration is that there are the following disadvantages to configuring the digital camera 100 to receive the developed images to which the cloud development processing is applied and checking the processing result on the digital camera 100: It takes the time for the development server 303 to apply the image processing and the time for the digital camera 100 to receive the processed images from the cloud storage 301 before the result of the image processing is checked on the digital camera 100. This means that the user waits long in vain and imaging opportunities can be lost during the waiting time unless the user is aware that it takes long before checking. Moreover, if the communication is discontinued, even more time is needed to check the result of the image processing or the result of the image processing becomes unable to be checked. By contrast, in the foregoing exemplary embodiment, the digital camera 100 that is the image transmission source issues an image processing instruction to the server, and a device different from the image transmission source accesses the server for the result of the image processing. This can reduce the waiting time of the image transmission source or reduce the risk of communication disconnection. Moreover, displaying the message 1211*b* prevents the user of the image transmission source from getting confused about how to check the result of the image processing, and the user can check the result of the image processing without confusion.

As a modification, the digital camera 100 may receive the developed images to which the cloud development processing by the development server 303 is applied, and the result of the cloud development processing can be checked on the digital camera 100. Here, the developed images are received by the communication unit 54. This, however, takes long before the result of the image processing can be checked on the digital camera 100 because of the foregoing reasons. In such a case, a guidance for prompting the user to check the result of the image processing on the display unit 28 after a lapse of some time from the image transmission may be displayed instead of or along with the message 1211*b*. Such a configuration has the advantage of not worrying the user, since the user is aware that the processing result can be checked within the digital camera 100 even if the processing result is returned to the transmission source after a delay due to the communication condition, for example. This can also prevent the user from waiting in vain to lose imaging opportunities or delay other operations because the user is unaware that it takes long to check the processing result on the digital camera 100.

The camera 100 saves power in communication processing by adaptively disconnecting the communication with the development server 303 based on the processing content.

Refer to FIG. 5, after establishing the communication connection with the development server 303 and obtaining the state of subscription to the service, the camera 100 once disconnects the communication as illustrated in steps S507 and S510. The camera 100 thus enters the "offline state" while displaying the cloud display menu 920.

The reason is that the communication connection with the server does not need to be maintained until the processing for transmitting the images to the development server 303 is performed in and after step S516, like during the processing for adding images to be developed in step S512. This can prevent the battery from being wasted by useless communication.

In displaying the cloud development menu in steps S508 and S511, the date and time when the displayed information is obtained may be displayed as well. This enables the user to identify whether the displayed information is the latest.

The camera 100 also controls reduction of useless communication even after the start of the processing for transmitting the images to the server.

Referring to FIG. 8, in step S813, the camera 100 updates the number of developable images managed by the own apparatus each time before an image is transmitted. The camera 100 then determines whether an image can be transmitted based on the updated latest number of developable images. Specifically, the camera 100 aborts transmission if the number of developable images is 0 before the transmission. This can prevent the error of transmitting an image that is unable to be developed. The battery can thus be prevented from being wasted by useless image transmission.

In the determination processing of step S813, the camera 100 may use the following method instead of inquiring of the development server 303 of the number of developable images.

If a plurality of images is selected to be developed, then in step S816, the camera 100 successively transmits the images one by one. Each time the transmission of an image is completed, the camera 100 may receive the number of developable images updated by the transmission along with a notification indicating the completion of the transmission. The number of developable images can thereby be efficiently obtained by using the communication of the image transmission completion notification.

In step S814, whether the Nth image in the transmission reservation list has been transmitted is determined in transmitting each image. However, the determination may be made on all the images in the transmission reservation list at a time before the processing for successively transmitting the images is started. This can simplify the processing.

In the processing of steps S815 and S816, the transmission history of the raw image file and/or the development parameter information may be stored for later use. Specifically, an icon indicating that the image has been transmitted may be displayed on an information display in browsing the image on the camera 100 based on the transmission history. This can prevent a situation where the number of developable images is uselessly decreased by repeatedly requesting the development of the same image.

The foregoing various controls described to be performed by the system control unit 50 may be performed by a single piece of hardware. A plurality of pieces of hardware (such as a plurality of processors and circuits) may control the entire apparatus by sharing the processing.

The present invention has been described in detail in conjunction with the exemplary embodiment thereof. However, the present invention is not limited to such specific exemplary embodiments, and various modes not departing from the gist of the invention are also included in the present invention. The foregoing exemplary embodiments demonstrate just one exemplary embodiment of the present invention each, and the exemplary embodiments can be combined as appropriate.

The foregoing exemplary embodiment has been described by using a case where the present invention is applied to the digital camera 100 as an example. However, such an example is not restrictive. More specifically, the present invention can be applied to apparatuses and electronic devices that can communicate with the network apparatuses such as the cloud storage 301, the development server 303, and the user setting management unit 304. More specifically, the present invention can be applied to a personal computer, a personal digital assistant (PDA), a mobile phone terminal, a portable image viewer, a printer apparatus including a display, a digital photo frame, a music player, a game machine, an electronic book reader, etc.

The present invention is not limited to an imaging apparatus main body, either, and can also be applied to a control apparatus that communicates with an imaging apparatus (including a network camera) via wired or wireless communication and remotely control the imaging apparatus. Examples of the apparatus that remotely controls the imaging apparatus include a smartphone, a tablet PC, and a desktop PC. The imaging apparatus can be remotely controlled by the control apparatus notifying the imaging apparatus of commands for performing various operations and making various settings based on operations made on the control apparatus and processing performed by the control apparatus. The control apparatus may receive a live view image captured by the imaging apparatus via wired or wireless communication, and display the received live view image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention is not limited to the foregoing exemplary embodiments, and various changes and modifications can be made without departing from the spirit and scope of the present invention. The following claims are therefore appended to make the scope of the present invention public.

According to the present invention, the user can check the result of image processing without confusion in a case where the server is instructed to perform the image processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An electronic apparatus capable of communicating with an image processing server, the electronic apparatus comprising:
one or more processors operating to:
transmit, to the image processing server, an image and information indicating an image processing parameter to be used when the image processing server performs image processing on the image; and
control display of a guidance after the first operation is made and before a second operation for giving an instruction to transmit the image to the image processing server is made, the guidance indicating that an image obtained by applying the image processing by the image processing server to the image is to be checked on another apparatus from the electronic apparatus.

2. The electronic apparatus according to claim 1, wherein the guidance further includes a message that the obtained image can be checked by connecting to the image processing server from the another apparatus.

3. The electronic apparatus according to claim 2, wherein the guidance further includes a message that the obtained image is to be checked by connecting to the image processing server from another apparatus using a user account where the electronic apparatus and the image processing server are associated with each other.

4. The electronic apparatus according to claim 1, wherein the another apparatus is at least one of a smartphone, a personal computer, and a tablet terminal.

5. The electronic apparatus according to claim 1, wherein the electronic apparatus does not receive the image to which the image processing is applied by the image processing server.

6. The electronic apparatus according to claim 1, wherein the image processing is raw development processing.

7. The electronic apparatus according to claim 1, wherein the electronic apparatus controls the display of the guidance in transmitting the image to the image processing server.

8. The electronic apparatus according to claim 1, wherein the electronic apparatus controls the display of the guidance after the first operation is made and before a communication connection with the image processing server is established.

9. The electronic apparatus according to claim 1, wherein the one or more processors further operating to:
accept an adjustment operation on the image processing parameter,
wherein the one or more processors transmit, to the image processing server, the image processing parameter adjusted based on the adjustment operation accepted together with the image.

10. The electronic apparatus according to claim 9,
wherein the one or more processors control recording of the image processing parameter adjusted based on the adjustment operation into an image file containing the image, and
wherein the one or more processors transmit the image file to the image processing server.

11. The electronic apparatus according to claim 1, wherein the image processing by the image processing server is usable only by a user account subscribed to an image processing service on the image processing server or a user account where a fee is charged for use of the image processing service.

12. The electronic apparatus according to claim 1, wherein the image processing by the image processing server includes at least one or more types of image processing the electronic apparatus is not capable of.

13. The electronic apparatus according to claim 1, further comprising imaging,
wherein the image is captured by the imaging unit.

14. A method for controlling an electronic apparatus capable of communicating with an image processing server, the method comprising:
transmitting, to the image processing server, an image and information indicating an image processing parameter to be used when the image processing server performs image processing on the image; and
controlling display of a guidance after the first operation is made and before a second operation for giving an instruction to transmit the image to the image processing server is made, the guidance indicating that an image obtained by applying the image processing by the image processing server to the image is to be checked on another apparatus from the electronic apparatus.

15. A non-transitory computer-readable storage medium which stores a program for causing a computer to execute a method, the method comprising:
transmitting, to the image processing server, an image and information indicating an image processing parameter to be used when the image processing server performs image processing on the image; and
controlling display of a guidance after the first operation is made and before a second operation for giving an instruction to transmit the image to the image processing server is made, the guidance indicating that an image obtained by applying the image processing by the image processing server to the image is to be checked on another apparatus from the electronic apparatus.

16. An electronic apparatus capable of communicating with an image processing server, the electronic apparatus comprising:
one or more processors operating to:
transmit, to the image processing server, an image before raw development and information indicating an image processing parameter to be used when the image processing server performs raw development processing as image processing on the image; and
control display of a guidance indicating that a developed image obtained by applying the raw development processing by the image processing server to the image is to be checked after a lapse of time from the transmitting,
receive the developed image to which the raw development processing is applied by the image processing server,
wherein the guidance indicates that if the developed image received is to be checked on the electronic apparatus, the developed image is to be checked after the lapse of time from the transmitting.

17. A method for controlling an electronic apparatus capable of communicating with an image processing server, the method comprising:
transmitting, to the image processing server, an image before raw development and information indicating an image processing parameter to be used when the image processing server performs raw development processing as image processing on the image; and
controlling display of a guidance indicating that a developed image obtained by applying the raw development processing by the image processing server to the image is to be checked after a lapse of time since the transmitting in the transmission step, receiving the developed image to which the raw development processing is applied by the image processing server, wherein the guidance indicates that if the developed image received is to be checked on the electronic apparatus, the developed image is to be checked after the lapse of time from the transmitting.

\* \* \* \* \*